(12) United States Patent
Tauro et al.

(10) Patent No.: US 9,052,331 B2
(45) Date of Patent: Jun. 9, 2015

(54) OPTICAL VELOCIMETRY SYSTEMS AND METHODS FOR DETERMINING THE VELOCITY OF A BODY USING FRINGES GENERATED BY A SPATIAL LIGHT MODULATOR

(75) Inventors: Sandeep Tauro, København NV (DK); Jean-Marc Muller, Boston, MA (US)

(73) Assignee: Dantec Dynamics A/S (DK)

( * ) Notice: Subject to any disclaimer, the term of this patent is extended or adjusted under 35 U.S.C. 154(b) by 0 days.

(21) Appl. No.: 13/600,513

(22) Filed: Aug. 31, 2012

(65) Prior Publication Data

US 2014/0063484 A1 Mar. 6, 2014

(51) Int. Cl.
G01P 3/36 (2006.01)
G01P 3/68 (2006.01)
G01S 17/58 (2006.01)

(52) U.S. Cl.
CPC .. *G01P 3/68* (2013.01); *G01S 17/58* (2013.01)

(58) Field of Classification Search
CPC ........... G01P 5/26; G01P 3/366; G01S 17/58; G01S 17/95; G01S 17/50
USPC .................. 356/28.5, 4.09, 4.1, 35.5, 450
See application file for complete search history.

(56) References Cited

U.S. PATENT DOCUMENTS

| | | | |
|---|---|---|---|
| 4,566,031 A | 1/1986 | Kirk | |
| 6,323,970 B1 | 11/2001 | Popovich | |
| 6,507,391 B2 | 1/2003 | Riley et al. | |
| 6,532,061 B2 | 3/2003 | Ortyn et al. | |
| 6,970,251 B2 | 11/2005 | Vikhagen | |
| 7,339,148 B2 | 3/2008 | Kawano et al. | |
| 7,420,673 B2 | 9/2008 | Hagler | |
| 7,812,950 B2 | 10/2010 | Sharpe | |
| 7,965,394 B2 | 6/2011 | Chen et al. | |
| 2001/0028483 A1* | 10/2001 | Buse | 359/15 |
| 2001/0035948 A1* | 11/2001 | Maeda et al. | 356/124 |
| 2002/0114027 A1 | 8/2002 | Horimai | |
| 2004/0156586 A1* | 8/2004 | Sahlgren et al. | 385/37 |
| 2005/0046821 A1 | 3/2005 | Hanson et al. | |
| 2010/0053629 A1 | 3/2010 | Kane | |
| 2010/0103246 A1 | 4/2010 | Schwerdtner et al. | |

(Continued)

OTHER PUBLICATIONS

Gharib, M., et al., Optical Microsensors for Fluid Flow Diagnostics, 40th AIAA Aerospace Sciences Meeting and Exhibit, 2001, American Institute of Aeronautics and Astronautics.

(Continued)

*Primary Examiner* — Isam Alsomiri
*Assistant Examiner* — Samantha K Abraham
(74) *Attorney, Agent, or Firm* — Rhodes Donahoe, LLC

(57) ABSTRACT

A velocimetry system for measuring the velocity of a moving body propagating through a measurement volume includes a light source for emitting a light beam, a controller for generating a modulation pattern corresponding to a desired set of fringes to be generated in the measurement volume, and a spatial light modulator operatively connected to the controller to receive therefrom the modulation pattern. The spatial light modulator is configured to spatially modulate the light beam according to the modulation pattern in order to generate the desired set of fringes in the measurement volume. Also provided are a light detector for measuring the energy of the light scattered by the moving body as it intersects the fringes, and a data analysis unit operatively connected to the light detector and adapted to determine the velocity of the moving body from at least one fringe characteristic and the energy of the scattered light measured.

72 Claims, 11 Drawing Sheets

(56) References Cited

U.S. PATENT DOCUMENTS

| 2010/0253995 | A1 | 10/2010 | Reichelt |
| 2011/0176129 | A1 | 7/2011 | Rastegar |
| 2011/0270088 | A1* | 11/2011 | Shiina ............................ 600/443 |
| 2013/0002968 | A1* | 1/2013 | Bridge et al. .................. 348/744 |

OTHER PUBLICATIONS

Werely, S.T. et al., Advanced Algorithms for Microscale Particle Image Velocimetry, AIAA Journal, 2002, pp. 1047-1055, vol. 40, Issue 6, Nature Publishing Group.

Xue, Zhenlan, Micro-sensing Techniques and Characterization of Ultrafast Healing Fuid Flow in a Microspace, 2010, thesis Hong Kong University of Science and Technology.

Ballik, E.A. et al., Fringe Image Techniques for the Measurement of Flow Velocities, Nov. 1973, Applied Optics, pp. 2607-2615, vol. 12, No. 11.

Witte, "Terrawatt-intensity few-cycle laser pulses," FOM Department, University of Amsterdam Jun. 13, 2007, [retrieved on Oct. 30, 2012]. Retrieved from the internet:<URL:http://www.nat.vu .nl/en/ImagesWitte-Thesis_tcm69-96390.pdf> pp. 1-184.

International Search Report and Written Opinion from corresponding International Application No. PCT/US2012/053283 (dated Jan. 23, 2013).

* cited by examiner

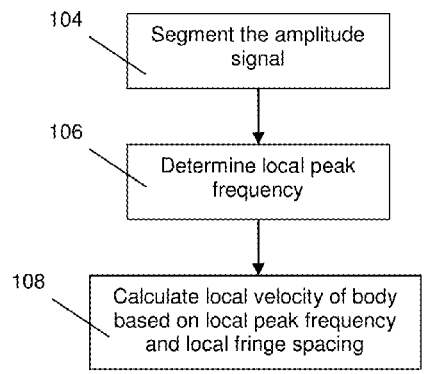
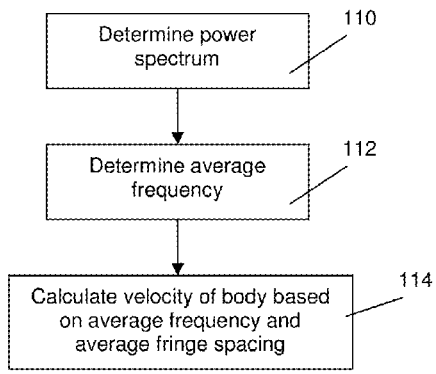
FIGURE 7A
FIGURE 7B
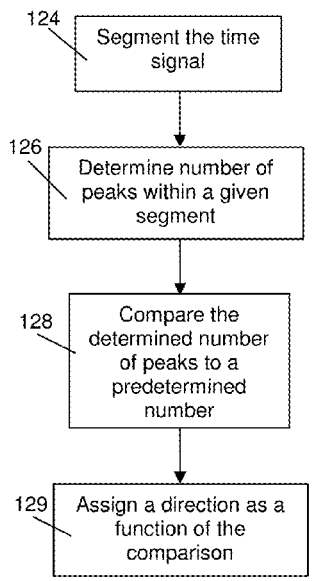
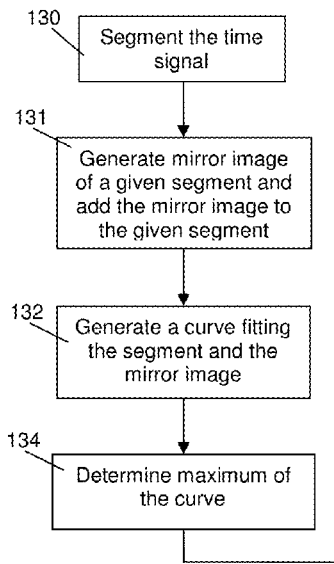
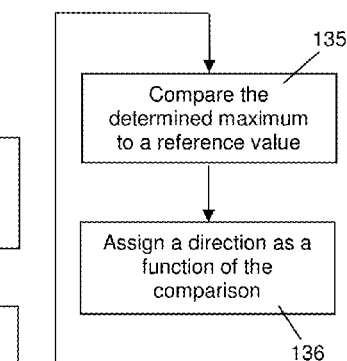
FIGURE 9A
FIGURE 9B

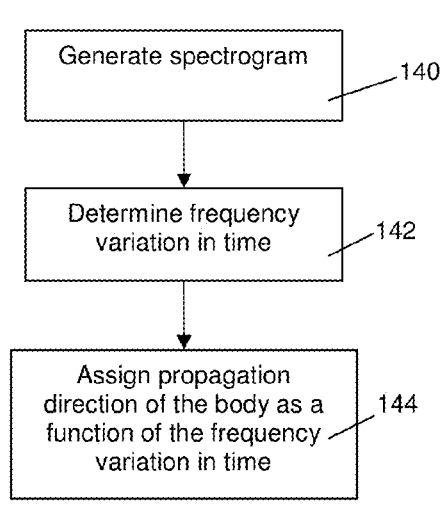
FIGURE 9C
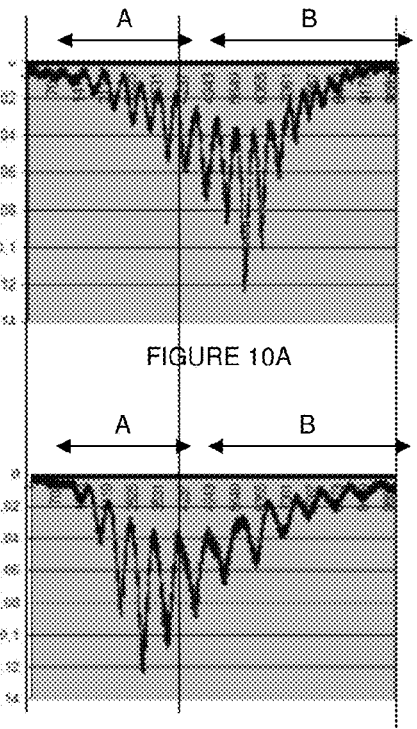
FIGURE 10A
FIGURE 10B
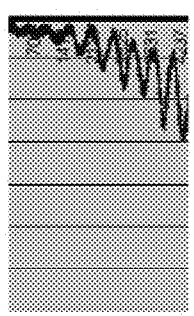
FIGURE 11A
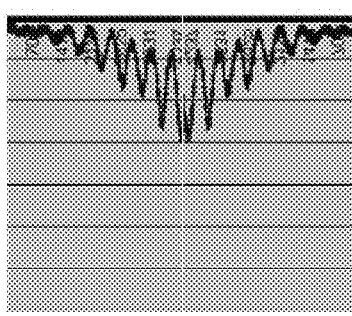
FIGURE 11B
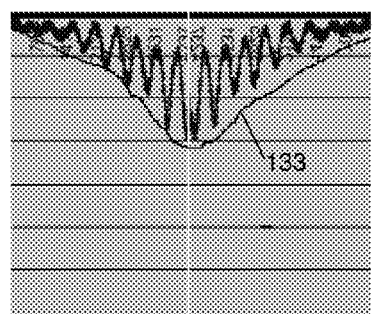
FIGURE 11C
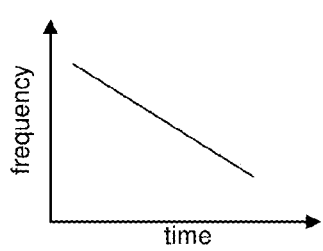
FIGURE 12A
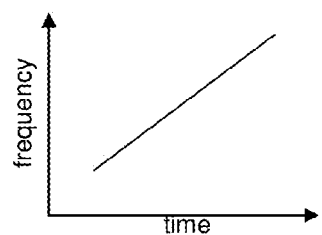
FIGURE 12B

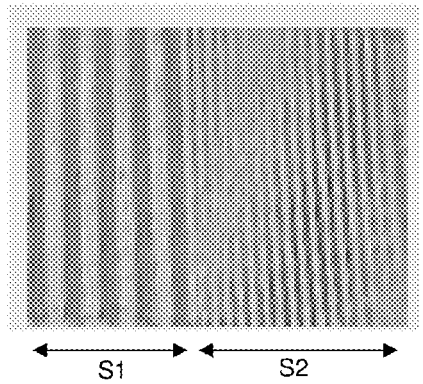
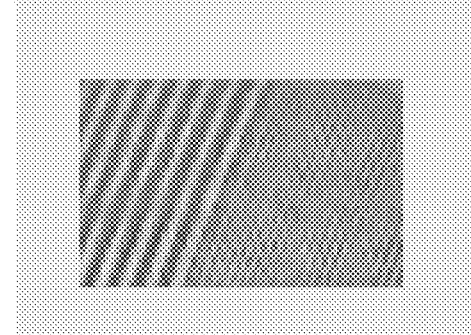
FIGURE 13A
FIGURE 13B
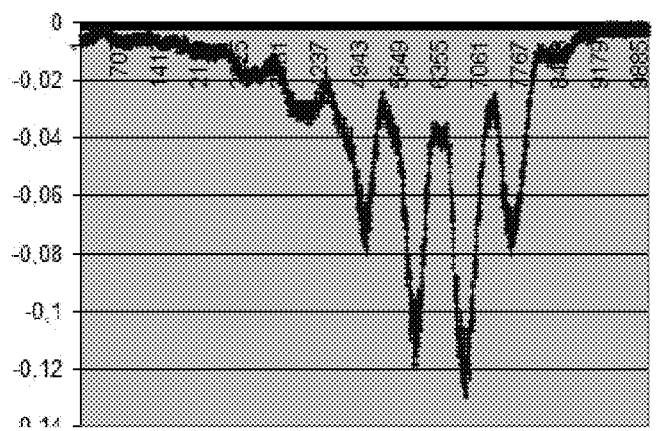
FIGURE 14
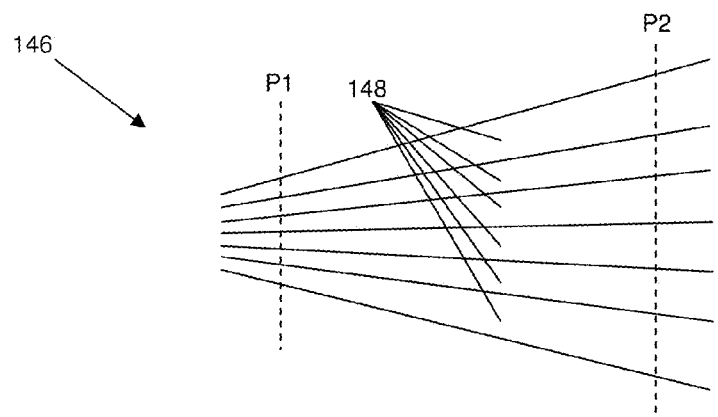
FIGURE 15

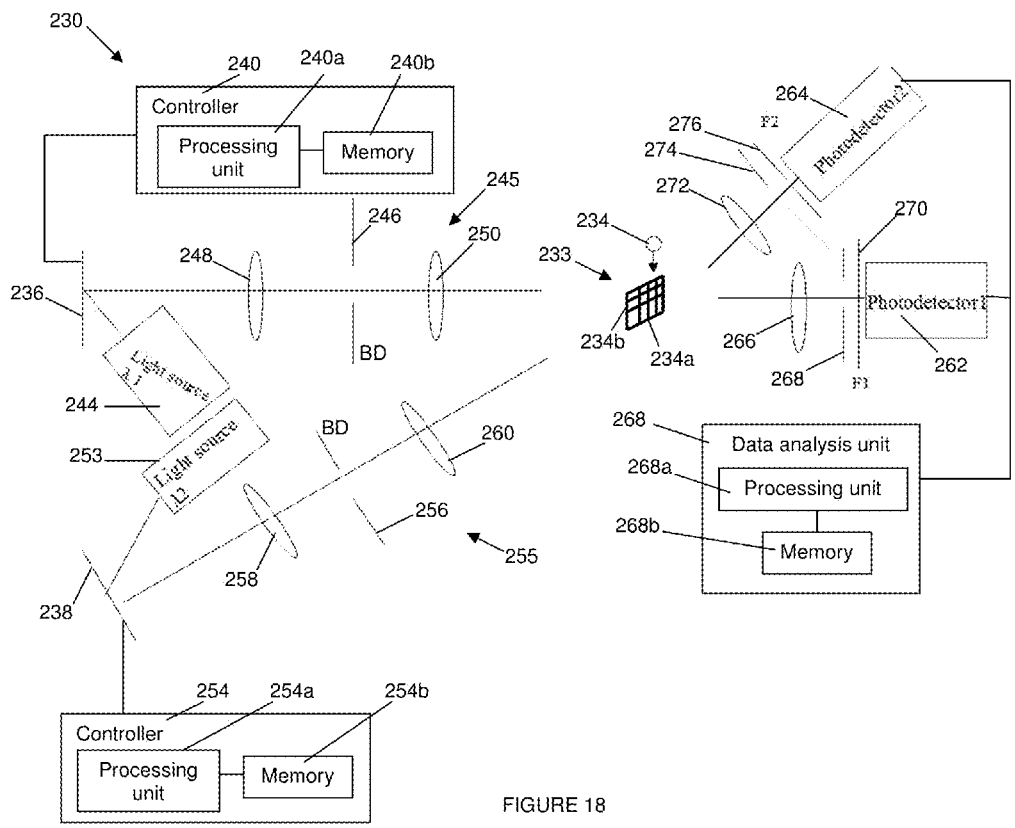
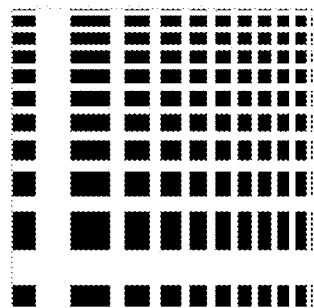 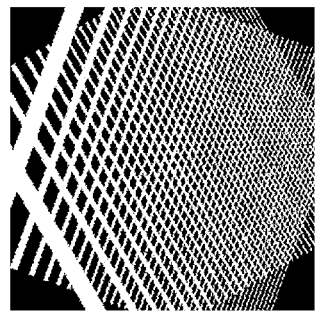
FIGURE 18
FIGURE 19A        FIGURE 19B

OPTICAL VELOCIMETRY SYSTEMS AND METHODS FOR DETERMINING THE VELOCITY OF A BODY USING FRINGES GENERATED BY A SPATIAL LIGHT MODULATOR

TECHNICAL FIELD

The present invention relates to the field of velocimeters, and more particularly to optical velocimetry systems.

BACKGROUND OF THE INVENTION

Optical velocimetry systems or velocimeters are non-intrusive instruments for measuring velocities of particles, moving surfaces, etc. An optical velocimetry system creates fringes made of bright planes of light alternating with dark planes within a measurement volume through which particles entrained in fluids or on moving surfaces propagate. The light scattered from the particles that bisect the fringes is detected and measured to determine the velocity of the particles.

In a Laser Doppler Velocimetry (LDV) system, the fringes are created by intersecting two laser beams together to generate interference fringes in a measurement volume. While a body propagates through the generated interference fringes, scattered light is generated and the intensity variation of the scattered light is substantially independent of the propagation direction. Therefore, the propagation direction of the body through the interference fringes cannot be determined from the measured intensity of the scattered light. A commonly used technique to resolve directional ambiguity consists in inserting a Bragg cell along the optical path of a given one of the two laser beams in order to frequency shift the given laser beam. However, such a technique requires additional pieces of equipment such as the Bragg cell for example, which increases the cost for the LDV system in addition to requiring further optical alignment procedures which are time-consuming. In addition, such LDV systems require the use of coherent light, i.e. laser light, for generating the interference fringes. Therefore, this feature limits the choice of adequate light sources for generating the interference fringes, and non-coherent light sources cannot be used for example. Furthermore, such LDV systems may not be adequate for specific applications such as some medical applications, due to laser safety issues.

An alternative approach for creating fringes consists in imaging a bar pattern such as a Ronchi grating in a measurement volume. As for the LDV system, the generated fringes are stationary and the same problem of directional ambiguity exists. Furthermore, the fringe spacing of the fringes generated using a Ronchi grating system is fixed and may not be changed. In order to change the fringe spacing, a different Ronchi grating must be used, which increases the cost. Furthermore, changing the Ronchi gratings and aligning the optical system thereafter are time-consuming steps.

Furthermore, these two approaches tend to afford only limited versatility. For example, orienting the fringes generated by an LDV system or a Ronchi grating system requires additional machinery, which also increases the overall cost for such systems.

Therefore, there is a need for an improved (and more versatile) method and system for determining the velocity of body within a fluid.

SUMMARY OF THE INVENTION

According to a broad aspect, there is provided a velocimetry system for measuring the velocity of a moving body propagating through a measurement volume. The system includes a light source for emitting a light beam, a controller for generating a modulation pattern corresponding to a desired set of fringes to be generated in the measurement volume and a spatial light modulator operatively connected to the controller unit to receive therefrom the modulation pattern. The spatial light modulator is configured to spatially modulate the light beam according to the modulation pattern in order to generate the desired set of fringes in the measurement volume. Also provided are a light detector for measuring the energy of the light scattered by the moving body as it intersects the fringes, and a data analysis unit operatively connected to the light detector and adapted to determine the velocity of the moving body from at least one characteristic of the fringes and the energy of the scattered light measured by the light detector.

In one feature, the light source is selected from the group consisting of: (a) a coherent light source; and (b) a non-coherent light source.

In another feature, the light source is adapted to emit visible light.

In a further feature, the modulation pattern is a transmittance pattern having a transmittance value for each point of the spatial light modulator.

In another feature, the modulation pattern is a reflectance pattern having a reflectance value for each point of the spatial light modulator.

In still another feature, the controller is adapted to determine the characteristics of the modulation pattern according to a user input. The user input includes the dimensions of the modulation pattern and the value of an optical property for each point of the modulation pattern. In another feature, the user input includes desired specifications for the fringes. In a further feature, the user input includes one of an estimated velocity for the moving body and an estimated range of velocity for the moving body.

In one feature, the spatial light modulator is adapted to operate in transmittance. The spatial light modulator has opaque regions arranged along a given direction and each opaque region is positioned between two transmissive regions. The opaque regions each substantially prevent light from propagating therethrough and the transmissive regions each allow light to propagate therethrough.

In another feature, the spatial light modulator is adapted to operate in reflectance. The spatial light modulator has reflective regions arranged along a given direction and each reflective region is positioned between two non-reflective regions. The reflective regions each substantially reflect light incident thereon and the non-reflective regions each prevent reflection of light thereon.

In an additional feature, the spatial light modulator is selected from the group consisting of: (a) a dynamic micro-mirror display; (b) a pico-projector; (c) a transmitting liquid crystal modulator; (d) a liquid crystal on silicon display; (e) a parallel aligned spatial light modulator; (f) a deformable mirror device; (g) a membrane spatial modulator; (h) a micro-electromechanical system; and (i) a micro-opto-electro-mechanical system.

In a further feature, the light detector is arranged for measuring the energy of the light scattered in one of a forward direction, a backward direction, and a direction other than the forward direction and the backward direction.

In another feature, the light detector is selected from the group consisting of: (a) a photomultiplier; (b) an avalanche photodiode detector; (c) a PIN diode; and (d) an ultrafast photodetector.

In one feature, the fringes generated in the measurement volume include unchirped fringes having a given fringe spacing, and the energy of the scattered light measured by the light detector corresponds to a time signal representing the measured energy as a function of time.

In yet another feature, the data analysis unit is adapted to: convert the energy of the scattered light measured by the light detector into a frequency domain to obtain a frequency signal; determine a peak frequency of the frequency signal; and calculate the velocity of the moving body using the determined peak frequency and the fringe spacing of the unchirped fringes.

In still another feature, the fringes generated in the measurement volume include fringes having a spatial variation.

In one feature, the fringes having a spatial variation include chirped fringes having a given average fringe spacing, and the energy of the scattered light measured by the light detector corresponds to a time signal representing the measured energy as a function of time.

In one feature, the data analysis unit is adapted to: segment the time signal into at least two time segments each having a respective local fringe spacing; convert a given one of the two time segments into a frequency domain to obtain a frequency segment; determine the local peak frequency of the frequency segment; and calculate the velocity of the moving body using the determined local peak frequency and the local fringe spacing corresponding to the given one of the two time segments.

In another feature, the data analysis unit is adapted to: determine a power spectrum for the time signal; determine an average frequency for the power spectrum; and calculate the velocity of the moving body using the average frequency and the given average fringe spacing of the chirped fringes.

In additional feature, the data analysis unit is further adapted to determine a propagation direction for the moving body.

In one feature, the data analysis is adapted to: segment the time signal into at least two time segments; determine a number of peaks within a given one of the at least two time segments; compare the determined number of peaks to a reference value; and determine the propagation direction for the moving body as a function of the comparison.

In another feature, the data analysis system is adapted to: segment the time signal into at least two time segments; generate a mirror image of a given one of the at least two time segments and add the mirror image to the given one of the at least two time segments; generate a curve fitting the given one of the at least two time segments and the mirror image; determine a maximum of the curve; compare the determined maximum to a reference value; and determine the propagation direction for the moving body as a function of the comparison.

In a further feature, the data analysis system is adapted to: generate a spectrogram of the time signal; determine a frequency variation in time using the spectrogram; and determine the propagation direction for the moving body as a function of the frequency variation;

In one feature, the fringes generated in the measurement volume include non-parallel bright planes of light alternating with non-parallel dark planes so that a fringe spacing varies along a length of the fringes.

In an additional feature, the data analysis unit is further adapted to determine a position along the length of the fringes at which the moving body intersects the fringes by comparing a frequency of the measured energy to reference frequency values.

In one feature, the velocimetry system further includes a 4f optical system positioned between the spatial light modulator and the measurement volume.

In a further feature, the velocimetry system further includes a 2f optical system positioned between the spatial light modulator and the measurement volume.

In one feature, the controller is adapted to rotate the modulation pattern according to different angular orientations to effect rotation of the fringes generated in the measurement volume.

In yet another feature, the data analysis is adapted to determine the velocity of the moving body for each one of the different angular orientations and select the greatest determined velocity as being an actual velocity for the moving body.

In a further feature, the modulation pattern is adapted to generate a first set of fringes and a second set of fringes within the measurement volume, the first and second sets of fringes having different orientations.

In an additional feature, the velocimetry system further includes an additional photodetector positioned at a position different than that of the light detector.

In one feature, the data analysis unit is further adapted to determine a size of the moving body using the phase difference between scattered light components detected by the light detector and the photodetector.

In one feature, the set of fringes is an image of the modulation pattern.

In another feature, the velocimetry system further includes an optical imaging system positioned between the spatial light modulator and the measurement volume for one of magnifying and demagnifying the fringes projected by the spatial light modulator, the fringes generated in the measurement volume being one of a magnified and a demagnified image of the modulation pattern, respectively.

In a further feature, the fringes generated in the measurement volume include interference fringes resulting from a Fresnel diffraction of the light beam incident on the spatial light modulator.

In one feature, the moving body is selected from the group consisting of: (a) a particle; (b) a droplet; (c) a microscopic object; (d) a biological cell; and (e) the constituent part of the biological cell.

According to another broad aspect, there is provided a method for determining the velocity of a moving body propagating through a measurement volume. The method includes: generating a modulation pattern for a spatial light modulator according to a desired set of fringes to be generated in the measurement volume; adjusting the optical properties of the spatial light modulator according to the modulation pattern; propagating a light beam on the spatial light modulator, thereby spatially modulating the light beam and generating the desired set of fringes in the measurement volume; measuring the energy of the light scattered by the moving body while propagating in the measurement volume and intersecting the fringes; and determining the velocity of the moving body using at least one characteristic of the fringes and the energy of the scattered light measured.

In one feature, the step of generating a modulation pattern includes generating a transmittance pattern having a transmittance value for each point of the spatial light modulator.

In another feature, the step of generating a modulation pattern includes generating a reflectance pattern having a reflectance value for each point of the spatial light modulator.

In a further feature, the step of adjusting the optical properties of the spatial light modulator causes a generation of opaque regions and transmissive regions on the spatial light modulator. The opaque regions are arranged along a given direction and each opaque region are positioned between two transmissive regions. The opaque regions each substantially prevent light from propagating therethrough and the transmissive regions each allow light to propagate therethrough.

In still another feature, the step of adjusting the optical properties of the spatial light modulator causes a generation of reflective regions and non-reflective regions on the spatial light modulator. The reflective regions are arranged along a given direction and each reflective region is positioned between two non-reflective regions. The reflective regions each substantially reflect light incident thereon and the non-reflective regions each prevent reflection of light thereon.

In one feature, the step of propagating a light beam includes propagating one of a coherent light beam and a non-coherent light beam on the spatial light modulator.

In an additional feature, the step of propagating a light beam includes propagating a beam of visible light on the spatial light modulator.

In another feature, the step of measuring the energy of the light scattered includes measuring the energy of light scattered in one of a forward direction, a backward direction, and a direction other than the forward direction and the backward direction.

Optionally, the step of generating a modulation pattern includes generating an unchirped pattern adapted to generate unchirped fringes having a given fringe spacing within the measurement volume. The energy of the scattered light measured by the light detector corresponds to a time signal representing the measured energy as a function of time.

In one feature, the step of determining the velocity of the moving body includes: converting the energy of the scattered light measured by the light detector into a frequency domain to obtain a frequency signal; determining a peak frequency of the frequency signal; and calculating the velocity of the moving body using the determined peak frequency and the fringe spacing of the unchirped fringes.

In another feature, the step of generating a modulation pattern includes generating a modulation pattern adapted to generate fringes having a spatial variation.

In one feature, the step of generating a modulation pattern adapted to generate fringes having a spatial variation includes generating a chirped pattern adapted to generate chirped fringes having a given average fringe spacing in the measurement volume, the energy of the scattered light measured by the light detector corresponding to a time signal representing the measured energy as a function of time.

In one feature, the step of determining the velocity of the moving body includes: segmenting the time signal into at least two time segments each having a respective local fringe spacing; converting a given one of the two time segments into a frequency domain to obtain a frequency segment; determining the local peak frequency of the frequency segment; and calculating the velocity of the moving body using the determined local peak frequency and the local fringe spacing corresponding to the given one of the two time segments.

In another feature, the step of determining the velocity of the moving body includes: determining a power spectrum for the time signal; determining an average frequency for the power spectrum; and calculating the velocity of the moving body using the average frequency and the given average fringe spacing of the chirped fringes.

In a further feature, the method further includes a step of determining a propagation direction for the moving body.

In still another feature, the step of determining the propagation direction for the moving body includes: segmenting the time signal into at least two time segments; determining a number of peaks within a given one of the at least two time segments; comparing the determined number of peaks to a reference value; and determining the propagation direction for the moving body as a function of the comparison.

Alternatively, the step of determining the propagation direction for the moving body includes: segmenting the time signal into at least two time segments; generating a mirror image of a given one of the at least two time segments and add the mirror image to the given one of the at least two time segments; generating a curve fitting the given one of the at least two time segments and the mirror image; determining a maximum of the curve; comparing the determined maximum to a reference value; and determining the propagation direction for the moving body as a function of the comparison.

In a further alternative feature, the step of determining the propagation direction for the moving body includes: generating a spectrogram of the time signal; determining a frequency variation in time using the spectrogram; and determining the propagation direction for the moving body as a function of the frequency variation.

In one feature, the step of generating a modulation pattern includes generating a modulation pattern adapted to create non-parallel fringes having non-parallel bright planes of light alternating with non-parallel dark planes, a fringe spacing of the non-parallel fringes varying along a length of the fringes.

In another feature, the method further includes a step of determining a position along the width of the fringes at which the moving body intersects the fringes by comparing a frequency of the measured energy to reference frequency values.

In a further feature, the method further includes a step of propagating a modulated light beam projected by the spatial light modulator through a 4f optical system positioned between the spatial light modulator and the measurement volume for reducing back reflections and scattering.

In one feature, the method further includes a step of propagating a modulated light beam projected by the spatial light modulator through a 2f optical system positioned between the spatial light modulator and the measurement volume.

In an additional feature, the method further includes a step of rotating the modulation pattern according to different angular orientations to effect rotation of the fringes generated in the measurement volume In still another feature, the step of determining the velocity of the moving body includes determining the velocity of the moving body for each one of the different angular orientations and selecting the greatest determined velocity as being an actual velocity for the moving body.

In one feature, the step of generating a modulation pattern includes generating a modulation pattern adapted to generate a first set of fringes and a second set of fringes within the measurement volume, the first and second sets of fringes having different orientations.

In another feature, the step of measuring the energy of the light scattered includes measuring a first scattered light component from a first position and a second scattered light component from a second position different from the first position.

In still another feature, the method further includes a step of determining a size of the moving body using the phase difference between first and second scattered light components.

In one feature, the set of fringes is an image of the modulation pattern.

In an additional feature, the method further includes a step of one of magnifying and demagnifying a modulated light beam projected by the spatial light modulator, the fringes generated in the measurement volume being one of a magnified and a demagnified image of the modulation pattern, respectively.

In another feature, the fringes generated in the measurement volume include interference fringes resulting from a Fresnel diffraction of the light beam incident on the spatial light modulator.

In yet another feature, the method further includes a step of urging the body to propagate in the measurement volume so as to cause the body to intersect the fringes and scatter light.

In still another feature, the method further includes a step of determining characteristics of the modulation pattern according to a user input.

In one feature, the user input includes the dimensions of the modulation pattern and a value of an optical property for each point of the modulation pattern.

In another feature, the user input includes desired specifications for the fringes.

In a further feature, the user input includes one of an estimated velocity for the moving body and an estimated range of velocity for the moving body.

BRIEF DESCRIPTION OF THE DRAWINGS

Further features and advantages of the present invention will become apparent from the following detailed description, taken in combination with the appended drawings, in which:

FIG. 7A is a flow chart illustrating the steps of a method for determining a velocity of a body traveling through chirped fringes, performed by the velocimetry system shown in FIG. 3 or 4;

FIG. 7B is a flow chart illustrating the steps of an alternate method to that shown in FIG. 7A;

FIG. 9A is a flow chart illustrating the steps of a method for determining the direction of travel of a body traveling through chirped fringes generated by the spatial light modulator of the velocimetry system of FIG. 3 or 4;

FIG. 9B is a flow chart illustrating the steps of an alternate method to that shown in FIG. 9A;

FIG. 9C is a flow chart illustrating the steps of an alternate method to that shown in FIG. 9B;

FIGS. 10A and 10B illustrate a segmentation of the time signals of FIGS. 8A and 8B, respectively, in accordance with an embodiment of the present invention;

FIG. 11A illustrates an exemplary segment of the time signal of FIG. 8A;

FIG. 11B illustrates a time signal which includes the segment of FIG. 11A and a mirror segment, in accordance with another embodiment of the present invention;

FIG. 11C illustrates an exemplary interpolation curve fitting the time signal of FIG. 11B;

FIGS. 12A and 12B are exemplary graphs showing decreasing frequency and an increasing frequency, respectively, as a function of time, as determined using the spectrogram generated by performing the steps shown in FIG. 9C;

FIG. 13A illustrates experimentally generated fringes having a first angular orientation using the spatial light modulator of the velocimetry system of FIG. 3 or 4;

FIG. 13B illustrates the experimentally generated fringes of FIG. 13A having a second and different angular orientation, in accordance with an embodiment of the present invention;

FIG. 14 is an exemplary graph of an intensity of light scattered by the body propagating through chirped fringes as a function of time, the chirped fringes having a second angular orientation different than the first angular orientation of the fringes from which FIG. 8A is derived;

FIG. 15 schematically illustrates fringes generated using the spatial light modulator of the velocimetry system of FIG. 3 or 4, the fringes having a non-constant fringe spacing along a length thereof;

FIG. 18 illustrates a schematic view of an exemplary deployment of a velocimetry system in accordance with another embodiment of the present invention, the velocimetry system including two spatial light modulators and two photodetectors for measuring forward-scattered light;

FIG. 19A is a schematic view of first and second sets of fringes generated by the spatial light modulators of the velocimetry system shown in FIG. 18 in accordance with one embodiment of the present invention, the first set of fringes being disposed perpendicular to a second set of fringes;

FIG. 19B is a schematic view of first and second sets of fringes generated by the spatial light modulators of the velocimetry system shown in FIG. 16 or 17 in accordance with another embodiment of the present invention, the first set of fringes intersecting the second set of fringes so as to form an angle of 50 degrees between the first and second sets of fringes;

In FIGS. 6A to 6C, 8A and 8B, 10A, 10B, 11A, 11B, 11C, 14, 20A and 20B the direct current (DC) component has been removed in the time signals illustrated therein.

DETAILED DESCRIPTION OF EMBODIMENTS OF THE INVENTION

Figure 1:
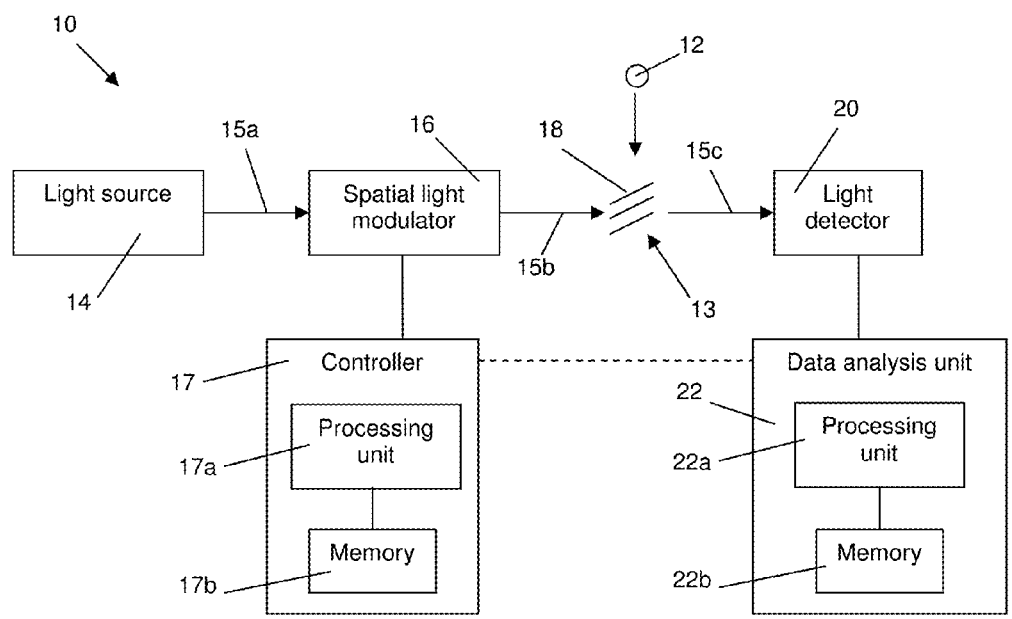
FIG. 1 is a block diagram showing the main components of a velocimetry system in accordance with one embodiment of the present invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Referring to FIG. 1, there is shown conceptually the main components of a velocimetry system 10 for determining the velocity of a body 12 passing through a measurement chamber or volume 13 (also known as an interrogation area or region). The measurement volume 13 may have a variety of shapes (e.g. ellipsoid or cuboid). The body 12 may be a particle (for instance, a smoke particle, or a particle entrained in a fluid), the surface of a moving body, a droplet, a microscopic object or the like. Moreover, the body 12 could also comprise biological materials (e.g. cells or any of its constituent parts).

The velocimetry system 10 includes a light source 14 for emitting a light beam 15a, a spatial light modulator 16 for modulating the light beam 15a emitted by the light source 14 in accordance with a light modulation pattern to generate fringes 18 (i.e. planar regions of light and dark planar regions arranged in an alternating fashion or pattern) in the measurement volume 13, a controller or controller 17 for configuring a light modulation pattern and for governing the operation of the spatial light modulator 16, a light detector (or photodetector) 20 for detecting and measuring the light scattered by the body 12 as it propagates through the fringes 18, and a data analysis unit 22 for determining the velocity of the body 12. It should be understood that the light detector 20 may further detect light reflected, refracted, and/or diffracted by the body 12 while propagating through the fringes 18.

The velocimetry system 10 may also include additional optical components such as lenses, mirrors, beam splitters, filters, pin holes, beam dumps, and the like in order to modify the optical path of the light beam, filter the light beams, etc. Specific arrangements of these additional optical components in the velocimetry system are shown in FIGS. 3, 4, 16, 17, 18 and are described in greater detail below.

The light source 14 is arranged so as to emit the light beam 15a toward the spatial light modulator 14. The light source 14 may be any device adapted to emit a beam of light. For example, the light source 14 may be a source of coherent light such as a laser. Alternatively, the light source 14 may be a source of incoherent light such as a light-emitting diode (LED), a halogen light source, or the like. Preferably, and for cost-effectiveness and technical reasons relating to coatings on windows of the spatial light modulator 16, optical elements, diffraction efficiency, and quantum efficiency of the photodetector 20, the light source 14 emits light in the visible spectrum. Although, this need not be the case in every application. For example, the light source 14 could emit infrared light, ultraviolet light, or the like.

The spatial light modulator 16 may be any device that imposes some form of spatially varying modulation on a beam of light (for example, by modulating the intensity and/or the phase of a light beam incident thereon). As explained in greater detail below, the spatial light modulator 16 may operate in transmittance mode or reflection mode, and may be selectively reconfigured by the controller 17 so that different preset, customized or user-defined modulations may be applied to an incident light beam 15a.

Examples of suitable spatial light modulators 16 include dynamic micromirror displays, pico-projectors, transmitting liquid crystal modulators, Liquid Crystal on Silicon (LCoS) displays, parallel aligned spatial light modulators, deformable mirror devices, membrane spatial modulators, micro-electromechanical systems (MEMS), micro-opto-electromechanical systems (MOEMS) and the like.

The controller 17 is operatively connected to the spatial light modulator 16 and includes a processing unit 17a coupled to a memory 17b for storing data. The processing unit 17a of the controller 17 is configured for generating a modulation pattern which has a value for an optical property, such as a transmittance value or a reflectance value, for each point or unitary element of the spatial light modulator 16. The modulation pattern, i.e. the value of the optical property for each point of the spatial light modulator 16, is determined on the basis of the desired characteristics of the fringes 18 to be generated in the measurement volume 13. During operation of the velocimetry system 10, the controller 17 transmits the modulation pattern to the spatial light modulator 16 which, in turn, adjusts the optical property value for each point to generate the desired fringes 18.

The characteristics of the generated fringes 18 such as their fringe spacing, chirp coefficient, dimensions, angular orientation, and the like may be changed from one measurement to another, or in substantially real-time during a given measurement via the controller 17. More specifically, the characteristics of the fringes 18 may be dynamically modified by altering the light modulation pattern for the spatial light modulator 16. For instance, by selectively changing the optical property value of at least some of the points of the spatial light modulator, the width of the dark planes and/or the bright planes contained in the fringes 18, the fringe spacing, the color/grayscale of the dark and/or bright planes, and/or the like may be adjusted.

In another example, unchirped fringes, i.e. fringes having a substantially constant fringe spacing therealong, may be dynamically changed to chirped fringes, i.e. fringes having varying fringe spacing. Additionally, it is possible to generate rotating fringes by rotating the modulation pattern on the spatial light modulator without requiring any additional machinery.

Based on the foregoing, it will be appreciated that the generation of the fringes 18 in accordance with the principles of the present invention may be characterized as being dynamic since it requires only a reconfiguration of the spatial light modular to be effected (which reconfiguration can be performed in some cases by a combination of software and/or hardware components). In contrast, prior art optical systems tend to generate fringes which can be characterized as static, in that they may only be changed by modifying optical components in the optical system, and/or adding additional mechanical or optical components.

In this embodiment, the controller 17 is adapted to set the characteristics of the modulation pattern according to a user input. The user input may specify any one or more of the following parameters: the dimensions of the modulation pattern, the value of optical property for each point of the modulation pattern, the desired specifications for the fringes 18 (such as the width of the dark planes, the width of the bright planes, the fringe spacing, and/or the like), the estimated speed (or range of speeds) of the body 12 traveling though the measurement volume 13 and optionally the detection bandwidth of the light detector 20. In operation, the processing unit 17a of the controller 17 could determine the characteristics of the modulation pattern based on the estimated speed (or range of speeds) of the body 12, and optionally the detection bandwidth of the light detector 20 as described below. For example, the processing unit 17a could first determine the characteristics of the fringes 18 that are suitable for measuring the estimated speed (or range of speeds), and then determine the characteristics of the modulation pattern required to produce those fringes.

Where the spatial light modulator 16 operates in transmission mode, the modulation pattern corresponds to a transmittance pattern which includes a transmittance value for each point or unitary unit of the spatial light modulator 16. In this case, the incident light beam 15a propagates through the spatial light modulator 16 and the transmittance of the spatial light modulator 16 varies therethrough according to the transmittance pattern provided by the controller 17. In a given direction, the spatial light modulator 16 includes opaque regions or stripes, each positioned between two transmissive regions or stripes. The opaque regions of the spatial light modulator 16 prevent light from propagating therethrough while the transmissive regions allow light to propagate therethrough. As a result, the incident beam 15a is spatially modulated and only portions of the incident light beam 15a are transmitted by the spatial light modulator 16 to generate a spatially modulated light beam 15b.

Where the spatial light modulator 16 operates in reflection mode, the modulation pattern corresponds to a reflectance pattern which includes a reflectance value for each point of the spatial light modulator 16. In this case, the incident light beam 15a is reflected by the spatial light modulator 16 and converted into a spatially modulated light beam 15b. The reflectance of the spatial light modulator 16 varies therethrough according to the reflectance pattern. In a given direction, the spatial light modulator 16 includes reflective regions or stripes that are each positioned between two non-reflective regions or stripes. The non-reflective regions of the spatial light modulator 16 prevent any reflection of light incident thereon while the reflective regions reflect light incident thereon. For example, the non-reflective regions may deflect the light incident thereon outside of the measurement volume 13. As a result, the incident beam 15a is spatially modulated, i.e. only the portions of the incident light beam that are incident on the reflective regions of the spatial light modulator 16 are reflected by the spatial light modulator 16.

It should be appreciated that the transmittance/reflectance pattern (i.e. the characteristics of the transmissive/reflective regions and the non-transmissive/non-reflective regions, such as the transmittance/reflectance values, the dimensions, etc.) may be chosen according to desired characteristics for the fringes 18 to be generated in the measurement volume.

In one embodiment, the set of fringes 18 corresponds to an image of the modulation pattern generated on the spatial light modulator 16. For example, the width of the bright fringes may be proportional to the width of the transmissive/reflective regions of the pattern, the width of the dark fringes may proportional to the width of the opaque/non-reflective regions of the pattern, the fringe spacing may be proportional to the distance between the centers of two following transmissive/reflective regions of the pattern, etc. In this case, the light transmitted by a transmissive spatial light modulator is substantially not diffracted. In another example, the set of fringes 18 is identical or substantially identical to the modulation pattern. In one embodiment, the velocimetry system 10 may further include an optical imaging system located between the spatial light modulator 16 and the measurement volume 13 for magnifying or demagnifying the fringes projected by the spatial light modulator 16. As a result, the set of fringes 18 generated in the measurement volume 13 may be a magnified or demagnified image of the modulation pattern generated on the spatial light modulator 16.

In another embodiment, the fringes 18 include interference fringes resulting from a Fresnel diffraction of the light beam incident on the spatial light modulator 16 which operates in transmission or in reflection. In this case, the width of the transmissive/reflective regions of the transmissive/reflective spatial modulator 16 is selected as a function of the wavelength of the incident light so that diffraction occurs. The width $z_n$ of the transmissive/reflective regions is chosen according the following equation:

$$z_n = n*2*d^2/\lambda$$

where n is the diffraction order, d the fringe spacing, and $\lambda$ the wavelength of the light emitted by the light source 14.

Turning now to the light detector 20, it is adapted to measure the energy of the light scattered 15c by the body 12 as it travels through the fringes 18 (i.e. the amplitude, intensity, and/or power of the scattered light). Examples of suitable light detectors include photomultipliers, avalanche photodiode detectors, PIN diodes, ultrafast photodetectors, and the like.

The light detector 20 is operatively connected to the data analysis unit 22 in order to transmit thereto the measured energy of the scattered light. The data analysis unit 22 includes a processing unit 22a coupled to a memory 22b for storing data. The processing unit 22a is configured for determining the velocity of the body 12 passing through the fringes 18 within the measurement volume 13 based on the received energy of the scattered light 15c (i.e. the amplitude, intensity, and/or power of the scattered light 15c) measured by the light detector 20, and the characteristics of the fringes 18, as described below.

In this embodiment, the data analysis unit 22 and the controller 17 are configured for data communication with each other so that the characteristics of the fringes 18 set by the controller 17 may be communicated to the data analysis unit 22. In an alternative embodiment, the data analysis unit 22 and the controller 17 may not be linked for data communication such that it may be necessary to manually enter characteristics of the fringes 18 into the data analysis unit 22. In such a case, the data analysis unit 22 could be provided with an input device for entering the characteristics of the fringes 18.

While in the embodiment shown in FIG. 1 the data analysis unit 22 and the controller 17 are distinct components, this need not be the case in every application. In certain applications, it may be desirable to incorporate the data analysis unit 22 and the controller 17 into a single component or device. For instance, such a device could be provided with a processing unit that is adapted to both control the spatial light modulator 16 and determine the velocity of the body 12.

It will be appreciated that the optical alignment of the light source 14 and the spatial light modulator 16, i.e. their relative positioning, is chosen so that the fringes 18 are generated at a desired location within the measurement volume 13. Moreover, the light detector 22 is arranged at an appropriate location relative to the measurement volume 13 in order to detect at least part of the light 15c scattered by the body 12 as it passes through the fringes 18. In FIG. 1, the light detector is positioned to detect forward-scattered light. But this arrangement is intended as an example only, because in other embodiments (for example, FIG. 4) the light detector could be positioned to detect back-scattered light or off-axis scattered light.

Figure 2:
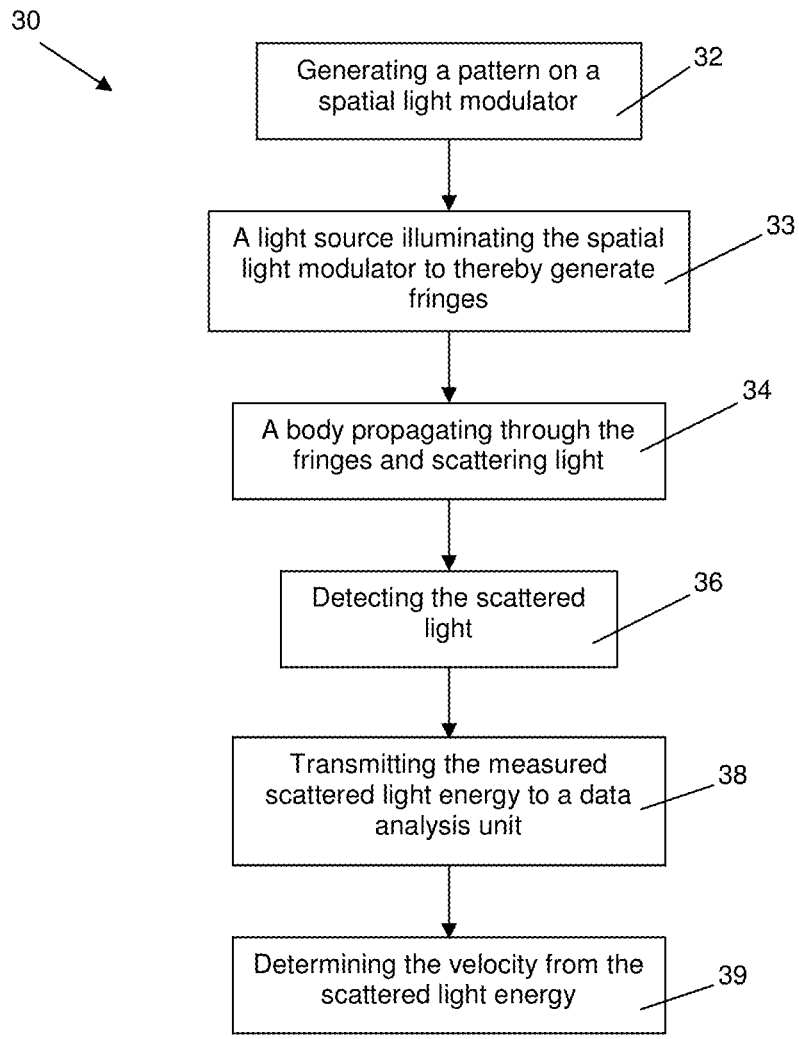
FIG. 2 is a flow chart illustrating the steps of a method for determining the velocity of a body traveling through a measurement volume, performed by the velocimetry system shown in FIG. 1.

With reference to FIG. 2, an exemplary method for determining the velocity of the body 12 traveling through the measurement volume 13 using the velocimetry system of FIG. 1 is now described. At step 32, the spatial light modulator 16 is configured to generate a modulation pattern thereon. The modulation pattern is adapted to produce fringes 18 having the desired characteristics. Such fringes 18 may be chirped or unchirped. As described below, unchirped fringes may be used for determining the velocity of a body propagating therethrough while chirped fringes may be used for determining both the velocity and propagation direction of a body propagating through the chirped fringes using the spatial variation in the fringe pattern of the chirped fringes. If the spatial light modulator 16 operates in transmission, then a transmittance pattern is generated. If the spatial light modulator 16 operates in reflection, then a reflectance pattern is generated.

While the present description refers to the generation of chirped fringes for determining the propagation direction of the moving body, the skilled person will understand that any fringes presenting spatial variations, e.g. asymmetrical fringes, aperiodic fringes, in the measurement volume may be used for determining the propagation direction of the moving body.

Optionally, the method could include a step of selecting the characteristics for the modulation pattern, which step is to be performed prior to step 32. This determining step could be based on user input, for example.

At step 33, the spatial light modulator 16 is illuminated using a light source 14. The spatial light modulator 16 spatially modulates the light received from the light source 14, thereby generating the set of fringes 18 within the measurement volume 13.

At step 34, the body 12 propagates through the fringes 18 within the measurement volume 13, thereby scattering light. At step 36, the light detector 20 detects the light scattered by the body 12 and measures the energy of the scattered light.

At step 38, the data analysis unit 22 receives the measured energy values transmitted by the light detector 20.

At step 39, the velocity of the body 12 moving through the measurement volume 13 is determined by the data analysis unit 22 based on the fringe spacing and the measured scattered light energy.

If the fringes used in the velocimetry system 10 are unchirped fringes, the steps 84 to 88 shown in FIG. 5 and described below, may be performed in order to determine the velocity of the body 12 propagating through the measurement volume 13. It should be appreciated that these steps will be applicable in cases where the measured scattered light energy is based on forward-scattered light energy, back-scattered light energy or light energy scattered in a direction other than the forward direction and the backward direction.

The amplitude, intensity, or power of the scattered light as a function of time is herein below referred to as a time signal.

Figure 5:
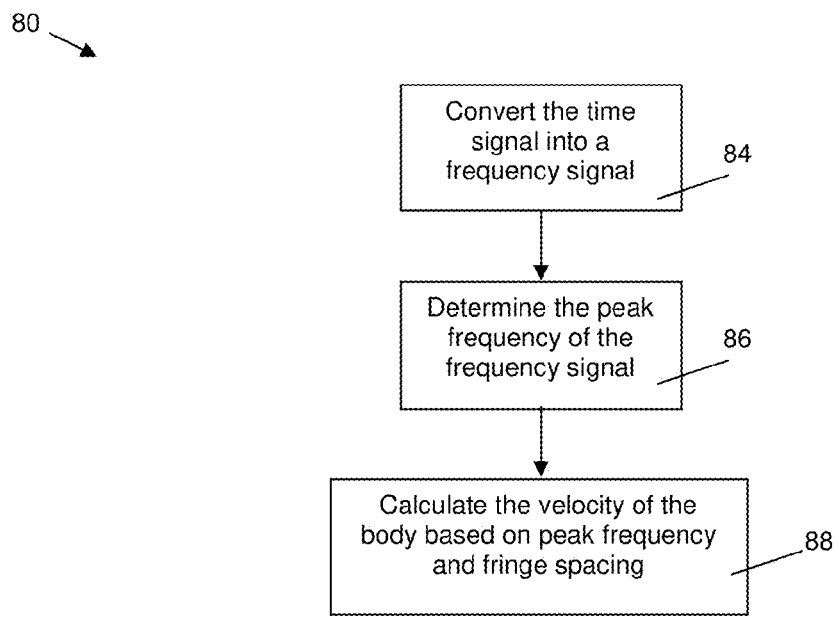
FIG. 5 is a flow chart illustrating the steps of a method for determining the velocity of a body traveling through unchirped fringes performed by the velocimetry system shown in FIGS. 3 and 4.

Referring to FIG. 5, at step 84, the time signal is converted into a frequency signal, which represents the amplitude, intensity, or power as function of frequency, using any suitable Fourier transform.

Figure 6A:
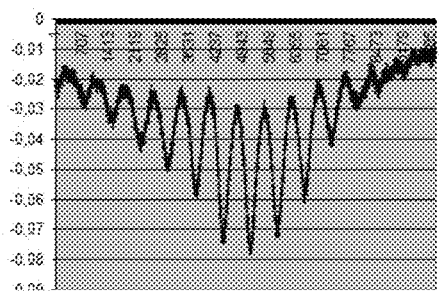
FIG. 6A is an exemplary graph of an intensity of scattered light generated by a first set of fringes having a first fringe spacing, as a function of time, the first set of fringes being generated by the spatial modulator shown in FIGS. 3 and 4.
Figure 6B:
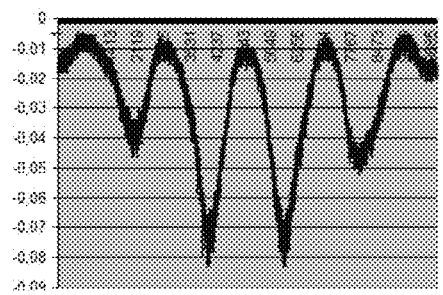
FIG. 6B is an exemplary graph of an intensity of scattered light generated by a second set of fringes having a second fringe spacing, as a function of time; the second fringe spacing being greater than the first fringe spacing shown in FIG. 6A.

FIG. 6A illustrates a first exemplary time signal, namely the intensity of light scattered by a first set of unchirped fringes having a first fringe spacing as a function of time. FIG. 6B illustrates a second exemplary time signal, i.e. the intensity of light scattered by a second set of unchirped fringes having a second fringe spacing greater than the first fringe spacing, as a function of time.

In one embodiment, the light beam generated by the light source 49 has a Gaussian intensity distribution and a short time Fourier transform (STFT) is used for converting the time signal into a frequency signal. In this case, the time signal S(t) is represented by the following equation:

$$S(t) = e^{-\gamma t^2} * \sin[2\pi(f_0 + kt^n)t]$$

Where $\gamma$ is the Gaussian parameter, k is the chirp rate, and n is the chirp coefficient (e.g. n=0 for unchirped fringes having a constant fringe spacing, n=1 for linearly chirped fringes, and n=2 for quadratically chirped fringes).

By digitizing the time signal S(t) to S(i) and applying the Short time Fourier Transform (STFT), one obtains the following equation:

$$STFT(i,k) = \left\{ \sum_{m=-\frac{L}{2}}^{\frac{L}{2}-1} s(i-m)g(m)W_L^{-mk} \right\}^2$$

where $0 < k < L/2$ and g(m) is the appropriate analysis window function.

The STFT performs a sliding window fast Fourier transform (FFT). The window function breaks the time domain signal into time slices. The FFT is computed for each time slice and the frequency information obtained is associated with the time index i in the middle of each time slice window.

While in the above description STFT is used for converting the time signal into the frequency domain, it should be understood that other suitable joint-time Fourier analysis methods may be used.

At step 86, the peak frequency of the frequency signal is determined. At step 88, the velocity V of the body is determined as a function of the determined peak frequency, according to the following equation:

$$V = f*d$$

where V is the body velocity, f is the peak frequency, and d is the fringe spacing.

Optionally, the time signal could be filtered before the frequency conversion. The filtering step may be numerically performed by the data analysis unit 22 or may be performed by any suitable electrical/electronic filter positioned between the photodetector 20 and the data analysis unit 22.

Figure 6C:
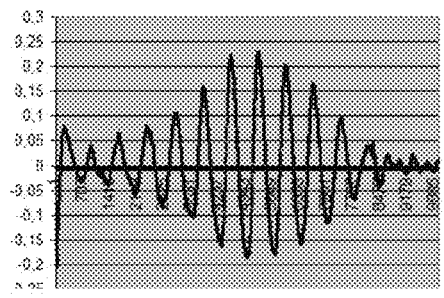
FIG. 6C is an exemplary filtered time signal corresponding to the time signal of FIG. 6A to which a low pass and high pass filtering has been applied.

For example, FIG. 6C illustrates an exemplary filtered time signal which corresponds to the time signal of FIG. 6A to which a low pass and high pass filtering has been applied.

If the fringes used in the velocimetry system 10 are chirped fringes, the steps 104 to 108 shown in FIG. 7A and described below, may be performed in order to determine the velocity of the body 12 propagating through the measurement volume 13. The steps 104 to 108 may be performed where the measured scattered light energy is based on forward-scattered light energy, back-scattered light energy or light energy scattered from a direction other than the forward direction or the backward direction.

Referring now to FIG. 7A, the time signal is segmented into at least two parts or segments, at step 104. The number of segments to be used and their respective time lengths may be determined by a calibration operation as further described below. During calibration, fringes 18 are generated in the measurement volume 13 and the characteristics of the generated fringes 18 (such as the fringe pattern thereof) are determined. Then, an expected time signal is determined using the fringe pattern of the fringes 18 and a given velocity for the body 12. The expected time signal is segmented and the characteristics of the segmentation, i.e. the number, time location, and/or time length of the time segments are stored in a database along with their respective expected time signal. During operation, a measured time signal is compared to the expected time signals stored in the database and the characteristics of the segmentation associated with the expected time signal that matches the measured time signal, are retrieved. The measured time signal is then segmented using the retrieved segmentation characteristics.

At step 106, for at least one time segment, the corresponding peak frequency (i.e. the corresponding local peak frequency $f_l$), and the corresponding local fringe spacing $d_l$ are determined. In order to determine the corresponding local peak frequency $f_l$, the at least one time segment is first converted into the frequency domain using any adequate JTFA method to obtain at least one frequency segment, and the corresponding local peak frequency $f_l$ is determined from the frequency signal. At step 108, the local velocity $V_l$ of the body 12 is calculated using the following equation:

$$V_l = f_l * d_l$$

In one embodiment, the velocity of the body 12 corresponds to a given local velocity. In this case, a single time segment may be converted in the frequency domain to obtain a single frequency segment, and the corresponding local velocity may be determined from the local peak frequency and fringe spacing for this single frequency segment.

In an alternative embodiment, the velocity of the body 12 corresponds to an average local velocity. In this case, the local velocity of at least two time segments is determined, and the velocity of the body 12 corresponds to the average local velocity for the at least two time segments.

FIG. 7A illustrates the series of steps that may be performed to determine the velocity of a body traveling through a measurement body upon which has been projected chirped fringes. In other embodiments, a different series of steps may be performed to achieve the same end. For example, the velocity of the body 12 may also be determined from an average frequency by performing the steps set out in FIG. 7B. At step 110, a power spectrum corresponding to the time signal is generated. In this case, the entire time signal is converted into the frequency domain using any suitable JTFA method. Then, at step 112, the average frequency $f_a$ for the obtained power spectrum and the average fringe spacing $d_a$ of the set of fringes 96 are determined. At step 114, the velocity of the body 12 is determined as being the average velocity $V_a$ obtained from the following equation:

$$V_a = f_a * d_a$$

Optionally, the time signal could be filtered before the frequency conversion. The filtering step may be numerically performed by the data analysis unit 22 after receiving the time signal from the photodetector 20, or by any suitable hardware filter adapted to filter an electrical signal and positioned between the photodetector 20 and the data analysis unit 22. For example, the filtering step may perform a low-pass filtering and/or a high-pass filtering on the time signal.

Figure 8A:
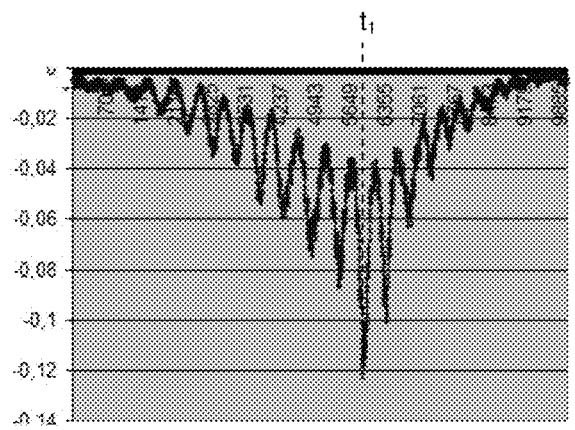
FIG. 8A is an exemplary graph of an intensity of light scattered by a body propagating through chirped fringes in a first direction as a function of time, the chirped fringes generated by the spatial light modulator of the velocimetry system of FIG. 3 or 4 and having a first angular orientation.
Figure 8B:
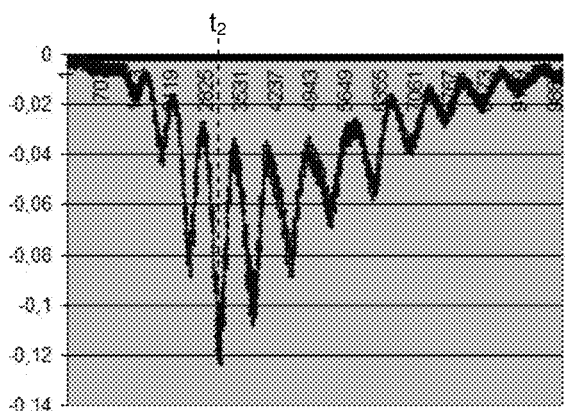
FIG. 8B is an exemplary graph of an intensity of light scattered by the body of FIG. 8A propagating through the chirped fringes of FIG. 8A in a second direction opposite to the first direction, as a function of time.

FIG. 8A illustrates an exemplary time signal for light scattered by the body 12 while passing through a given set of chirped fringes according to a first direction. The time signal corresponds to the intensity of the scattered light as a function of time. The peak intensity occurs at time $t_1$. FIG. 8B illustrates the time signal for the scattered light when the body propagates through the set of fringes in a second and opposite direction. One can note that the time signals of FIGS. 8A and 8B are not identical. For example, the peak intensity corresponding to the second direction occurs at a time $t_2$ that is shorter than the time $t_1$. Therefore, the difference between the time signal corresponding to the first direction of propagation of the body 12 and the time signal corresponding to the second and opposite direction of propagation of the body 12 can be used for determining the direction of propagation of a body passing through a set of chirped fringes.

An exemplary method of determining the direction of propagation of a body 12 passing through a set of chirped fringes is now described with reference to FIG. 9A. At step 124, the time signal is segmented into at least two parts or segments. FIG. 10A illustrates an exemplary segmentation of the time signal of FIG. 8A, which corresponds to the first propagation direction. As a result of the segmentation, the time signal of FIG. 8A includes a first time segment A and a second time segment B. In FIG. 10B, the same time segmentation as in FIG. 10B is applied to the time signal of FIG. 8B which corresponds to the second and opposite direction.

Next, the number of peaks for the given time segment, such as segment A of FIG. 10A, is determined at step 126. Thereafter, the direction of propagation for the body 12 is calculated using the determined number of peaks within the given time segment. At step 128, the determined number of peaks is compared to a reference number of peaks. The reference number of peaks may be determined in a calibration step performed prior to step 124.

At step 129, a direction of propagation for the body is assigned as a function of the comparison performed at step 128. If the determined number of peaks is found to be greater than the reference number of peaks, then the direction of propagation of the body 12 is assumed to correspond to a first direction.

Alternatively, if the determined number of peaks is found to be less than the reference number of peaks, then the direction of the body 12 is assumed to correspond to a second direction being opposite to the first direction.

While the direction of propagation may be determined using the number of peaks in a given time segment as described above, it will be appreciated that in another embodiment, the direction of propagation may be determined from the peak value of a given time segment (i.e. the peak amplitude, the peak intensity, or the peak power of the time segment depending on whether the time signal corresponds to the amplitude, intensity, or power signal, respectively). The methodology for determining the direction of propagation based on the peak value of a given time segment is described below with reference to FIG. 9B.

After segmenting the time signal at step 130, the peak value, such as the peak intensity for example, of a given segment is determined. At step 131, a mirror image of the time segment A (shown in FIG. 11A), i.e. the time segment A', is generated and added to the time segment A, as illustrated in FIG. 11B. Then, at step 132, a curve fitting step is performed to generate a curve passing by the peaks of the time segments A and A'. It should be understood that any suitable interpolation method may be used. In the present example, a Gaussian fitting is performed to obtain a Gaussian curve 133 passing through the peaks of the time segments A and A'. In other embodiments, other fittings may be employed to similar advantage, for example, polynomial interpolation. At step 134, the maximum of the curve is then determined and the peak value of the given segment is obtained.

At step 135, the peak value is compared to a threshold or reference value stored on the memory 22*b* of the data analysis unit 22. At step 136, the propagation direction of the body 12 is assigned as a function of the comparison performed at step 135. If the peak value is greater than the reference value, then the direction of propagation is determined to correspond to a first direction. If the peak value is found to be less than the reference value, then the propagation direction is determined to correspond to the direction opposite to the first direction.

In an alternative embodiment, the direction of propagation may be determined from the evolution in time of the frequency of the scattered light. More specifically, if the frequency decreases in time, then the propagation direction of the body 12 corresponds to a first direction. If the frequency increases in time, then the propagation direction of the body 12 corresponds to a second direction opposite to the first direction. FIG. 9C sets out the steps to be performed using this methodology.

At step 140, a spectrogram corresponding to the time-varying spectral representation of the time signal received at step 140 is generated. Then, the variation of the frequency in time is determined from the spectrogram at step 142. Thereafter, the propagation direction is determined from the frequency variation, at step 144. More specifically, if, as illustrated in FIG. 12A, the frequency variation is negative (i.e. if the frequency decreases as a function of time), then the propagation direction of the body 12 is determined to correspond to a first direction). If, as illustrated in FIG. 12B, the frequency variation increases in time (i.e. the frequency increases as a function of time), then the propagation direction of the body 12 is determined to be opposite to the first direction.

While the steps of segmenting the time signal illustrated in FIGS. 7A, 9A, and 9B are referred to by different reference numbers, i.e. 104, 124, and 130, respectively, to thereby show that the segmentations performed during these steps are different, the person skilled in the art will appreciate that the segmentations performed at steps 104, 124, and/or 130 may be substantially identical. For example, the same segmentation of a time signal may be used for both determining the velocity of the body 12 using the method of FIG. 7A and determining the propagation direction of the body 12 using the method of FIG. 9A or 9B.

It should also be appreciated that in certain applications, the velocity of the body may be determined using the method of FIG. 7A or 7B, but the velocimetry system may be configured not to determine the propagation direction of the body. In other applications, the system could be configured to determine the propagation direction of the body using any one of the methods illustrated in FIGS. 9A to 9C, but not the velocity of the body. In still other applications, both the velocity and propagation direction of the body are determined. In such applications, the determination of the velocity and that of the propagation direction may be performed concurrently. Alternatively, the determination of the velocity may be performed prior to that of the propagation velocity, or this order of determination may be reversed.

A velocimetry system constructed in accordance with the principles of the present invention may be deployed in a number of different ways. For example, the velocimetry system may be configured to determine the velocity of a moving body based on the measured back-scattered light, forward back-scattered light or light energy scattered in a direction other than the forward direction and the backward direction. The velocimetry system may be adapted to generate constant fringe spacing (or unchirped) fringes, linearly chirped fringes, quadratically chirped fringes, rotating fringes, etc. The velocimetry system may also be adapted to generate more than one set of fringes in the measurement volume 13. For example, a single spatial light modulator may be adapted to generate at least two different modulation patterns in order to generate at least two sets of fringes within the measurement volume.

In another example, the velocimetry system may include at least two spatial light modulators each adapted to generate a respective modulation pattern in order to generate at least two sets of fringes within the measurement volume.

Below, different exemplary deployments of the velocimetry system are described.

Figure 3:
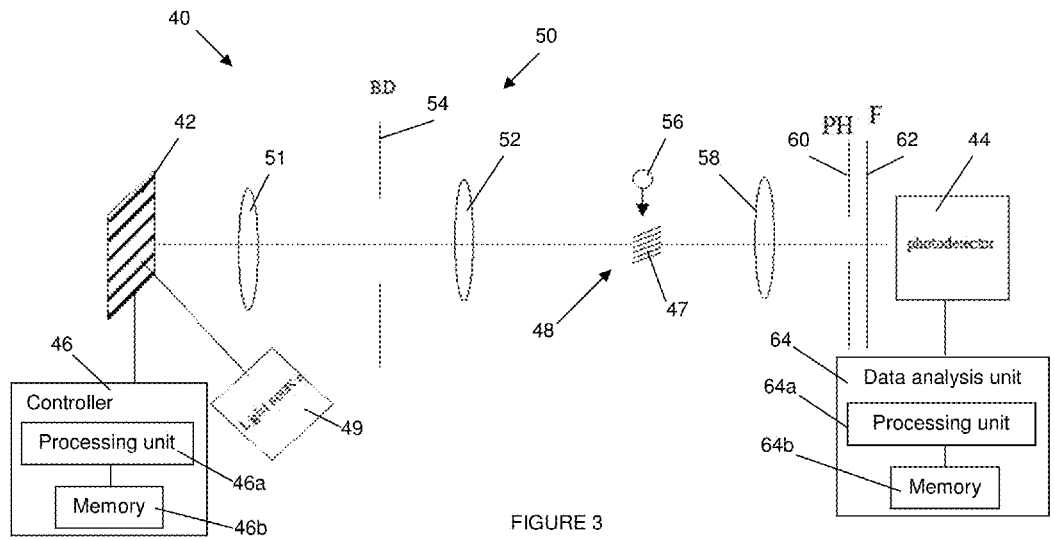
FIG. 3 is a schematic view of an exemplary deployment of a velocimetry system in accordance with an embodiment of the present invention, the velocimetry system including a single reflective spatial modulator for generating unchirped fringes and a photodetector for measuring forward-scattered light.

Referring to FIG. 3, there is shown an optical velocimetry system 40 having a reflective spatial light modulator 42 and a light detector 44 positioned for measuring forward-scattered light. The spatial light modulator 42 is configured via a controller 46 for generating a reflectance pattern adapted to generate unchirped fringes 47, i.e. the fringe spacing is substantially constant along the set of fringes 47, within a measurement volume 48. For example, the generated reflectance pattern may comprise reflective stripes each positioned between two non-reflective stripes.

A light source 49 generates a light beam that propagates on the spatial light modulator 42. The light source 49, the controller 46, the spatial light modulator 42 are generally similar to their counterparts shown in FIG. 1—light source 14, the controller 17, the spatial light modulator 16, respectively. In like fashion to controller 17, the controller 46 has a processing unit 46*a* and a memory 46*b*. Similarly, the data analysis unit also possesses a processing unit 64*a* and memory 64*b*.

Also provided, is a 4f optical system 50 disposed between the spatial light modulator 42 and the measurement volume 49. The 4F optical system 50 serves to process the spatially modulated light of beam, i.e. reducing back reflections and scattering. In addition, it preserves the phase of the spatially modulated laser beam thereby minimizing optical aberrations. The 4F optical system 50 includes a pair of first and second lenses 51 and 52 and a beam dump 54 positioned between the first and second lenses 50 and 52. The second lens 52 is arranged at a location rearward of the measurement volume 48. The first lens 51 focuses the spatially modulated light beam on the beam dump 54 which in turn suppresses the diffraction orders of the spatially modulated light beam. The second lens 52 focuses the light beam processed by the beam dump 54 within the measurement volume 48 to generate the fringes 47 therein.

The velocimetry system 40 further includes a third lens 58, a pinhole 60, and a filter 62; all of which arranged between the measurement volume 49 and the photodetector 44. More specifically, the third lens 58 is positioned forwardly of the measurement volume 49. The pinhole 60 is disposed between the third lens 58 and the filter 62; and the filter 62 is positioned between the pinhole 62 and the photodetector 44. The lens 58 serves to collect at least some of the light forwardly scattered by the body 56 while propagating through the fringes 47. The pinhole 60 spatially filters the beam of scattered light propagating from the lens 58 and the filter 62 serves to spectrally filter the light coming from the pinhole 60, i.e. the filter only allows light having the wavelength of the light source 49 to propagate therethrough.

The photodetector 44 measures the energy of the received scattered light, and transmits the measured energy to a data analysis unit 64.

In operation, the controller 46 determines a reflectance pattern adapted to generate the fringes 47 according to a user input for example, and transmits the reflectance pattern to the spatial light modulator 42. The spatial light modulator 42 generates the received reflectance pattern by adjusting the reflectance value of each point or unitary element thereof. The light source 49 emits a light beam which is incident on the spatial light modulator 42. The spatial light modulator 42 reflects and spatially modulates the incident light beam to propagate a spatially modulated light beam. The spatially modulated light beam is focused by the lens 51 on the beam dump 54 which suppresses the diffraction orders of the spatially modulated light beam.

Then the spatially modulated light beam is focused by the lens 52 within the measurement volume 49 to generate the fringes 47 therein. Once the fringes 47 have been generated, the body 56 is urged to propagate therethrough and scatters light. Some of the forward scattered light is collected by the lens 58 and this collected light is focused on the pinhole 60 by the lens 58. The scattered light is then spatially and spectrally filtered by the pinhole 60 and the filter 62, respectively, before reaching the photodetector 44. The photodetector 44 measures the energy of the received scattered light, and transmits the measurement to a data analysis unit 64. The data analysis unit 64 determines the velocity of the body 56 passing through the measurement volume 48 using the method(s) described above.

Figure 4:
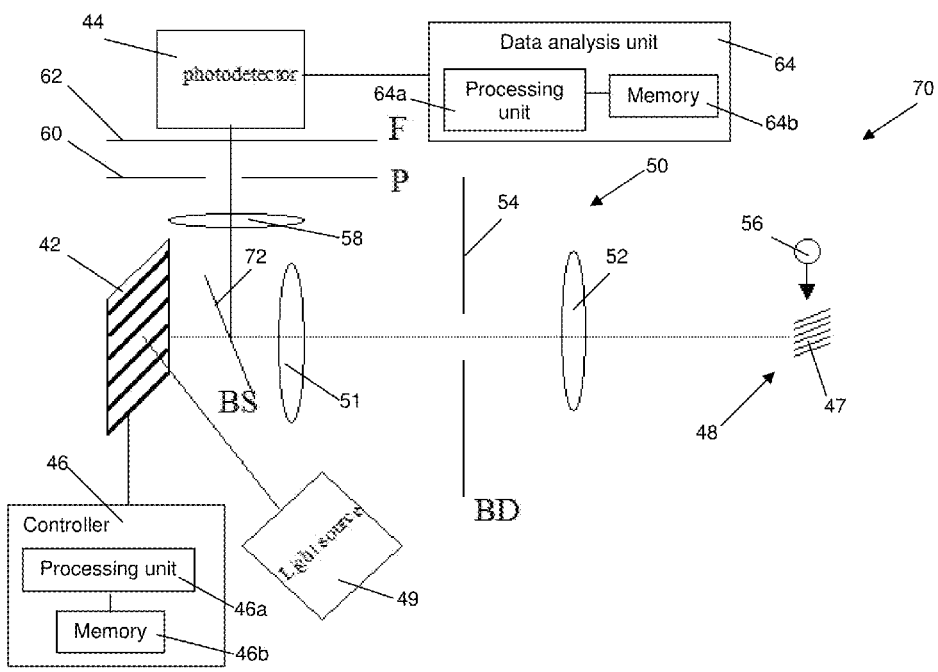
FIG. 4 is a schematic view of an exemplary deployment of a velocimetry system in accordance with another embodiment of the present invention, the velocimetry system including a single reflective spatial modulator for generating unchirped fringes and a photodetector for measuring back-scattered light.

FIG. 4 illustrates an alternative embodiment to that shown in FIG. 3. In this embodiment, an optical velocimetry system 70 is configured for measuring the velocity of a body 56 traveling through the measurement volume 48 based on back-scattered light energy measurements. The velocimetry system 70 is generally similar to the velocimetry system 40 in that it also includes a reflective spatial light modulator 42, a controller 46, a light source 49, a 4f optical system 50 (including first and second lenses 51 and 52, and a beam dump 54), a photodetector 44, and a data analysis unit 64. These elements are arranged in a manner generally similar to those counterpart elements shown in FIG. 3. Also provided are a third lens 58, a pinhole 60, and a filter 62. However, as explained below, these are deployed differently in this embodiment. Lastly, the velocimetry system 70 includes an additional element—beam splitter 72.

The spatial light modulator 42 is configured via a controller 46 for generating a reflectance pattern for producing unchirped fringes 48. The light source 49 is arranged so as to emit a light beam having a predetermined wavelength on the spatial light modulator 42.

The beam splitter 72 is positioned between the spatial light modulator 42 and the 4f optical system 50 (more specifically, the first lens 51). The beam splitter 72 allows at least a portion of the modulated light beam coming from the spatial light modulator 42 to propagate through the 4f optical system 50 and serves to redirect at least some of the light back-scattered by the passage of the body 56 through the measurement volume, towards the third lens 58.

The beam dump 54 is arranged between the first and second lenses 51 and 52. The second lens 52 is arranged at a location rearward of the measurement volume 50.

In this embodiment, the lens 58, the pinhole 60, and the filter 62 are located between the beam splitter 72 and the photodetector 44 in order to filter and focus the back-scattered light on the photodetector 44.

In operation, the controller 46 determines a reflectance pattern adapted to generate the fringes 47 according to a user input for example, and transmits the reflectance pattern to the spatial light modulator 42. The spatial light modulator 42 generates the received reflectance pattern by adjusting the reflectance value of each point or unitary element thereof. The light source 49 emits a light beam which is incident on the spatial light modulator 42. The spatial light modulator 42 reflects and spatially modulates the incident light beam to propagate a spatially modulated light beam. At least some of the spatially modulated light beam passes through the beam splitter 72 and is focused by the lens 51 on the beam dump 54 which suppresses the diffraction orders of the spatially modulated light beam.

Thereafter, the spatially modulated light beam is focused by the lens 52 within the measurement volume 49 to generate the fringes 47 therein. Once the fringes 47 have been generated, the body 56 is urged to propagate therethrough and scatters light. Some of the back-scattered light is collected by the lens 52 and is focused on the beam dump 54. The back-scattered light propagating through the beam dump 54 passes through the lens 51 before reaching the beam splitter 72. At least some of the back-scattered light is then redirected by the beam splitter 72 in the direction to the third lens 58.

The back-scattered light collected by the third lens 58 is focused on the pinhole 60. The scattered light is then spatially and spectrally filtered by the pinhole 60 and the filter 62, respectively, before reaching the photodetector 44. The photodetector 44 measures the energy of the received scattered light, i.e. its amplitude, intensity or power, and transmits the measurement to the data analysis unit 64. The data analysis unit 64 determines the velocity of the body 56 while passing through the measurement volume according to the method(s) described above.

It should be appreciated that the velocimetry system 10, 40 or 70 could be configured to rotate a set of fringes and/or generate a rotating set of fringes. In such cases, the controller 17, 46 could generate a suitable modulation pattern on the spatial light modulator 16, 42, which modulation pattern could be rotated to produce a corresponding set of rotating fringes. Where the generated set of fringes is unchirped, then the velocity of a body propagating through the rotating fringes may be determined. Where chirped fringes are generated, then both the velocity and direction of propagation can be determined.

FIG. 13A illustrates a set of unchirped fringes having a vertical angular orientation and experimentally generated in a measurement volume. The set of fringes includes first and second sections S1 and S2 placed side by side. In the first section S1, the unchirped fringes are spaced apart by a first fringe spacing and in the second section S2, the unchirped fringes are spaced apart by a second fringe spacing which is less than the first fringe spacing. By rotating the modulation pattern used for generating the fringes by a given angle, the set of fringes is also rotated by the given angle as illustrated in FIG. 13B.

The controller 17, 46 can be actuated to generate a first reflectance pattern having a given first angular orientation according to a desired set of unchirped or chirped fringes. More specifically, the controller 17, 46 determines a respective reflectance value for each point of the spatial light modulator 42 according to the desired set of fringes to be generated in the measurement volume. Thereafter, at least a second reflectance pattern having a second and different angular orientation is generated by the controller 17, 46. More specifically, the controller 17, 46 determines a second reflectance value for each point of the spatial light modulator 16, 42 to obtain the second reflectance pattern and transmits the second reflectance pattern to the spatial light modulator 16, 42 which adjusts the reflectance of each point accordingly. The second reflectance pattern thus generated corresponds to the first reflectance pattern but is rotated by a given angle. As a result, the generated fringes are rotated.

The controller 17, 46 can be configured to rotate the reflectance pattern for the spatial light modulator 16, 42 in a continuous or incremental (stepwise) manner in order to effect a likewise rotation in the fringes. The controller can be configured to effect any desired degree of rotation in the modulation pattern (and fringes). However, it should be appreciated that rotating the fringes by 180 degrees may be sufficient to cover all possible directions for the moving body 12, 56 and therefore permit its velocity only (in the case of unchirped fringes), or its velocity and propagation direction (in the case of chirped fringes), to be determined. The controller 17, 46 can further be configured to transmit to the data analysis unit 22, 64 the angular orientation of the fringes, as the fringes are being rotated. This data is stored in the memory 22b, 64b of the data analysis unit 22, 64.

Where the modulation pattern (and consequently, the fringes) is rotated, the photodetector 20, 44 detects some of the light scattered by the body 12, 56 while passing through the rotating fringes and transmits the measured energy in time to the data analysis unit 22, 64.

FIG. 14 features a graphical representation of the intensity of scattered light as a function of time which is obtained when the modulation pattern and unchirped fringes used for generating the time signal of FIG. 8A have been rotated by 20 degrees and the direction of the body 12, 56 remains unchanged.

The data analysis unit 22 can be configured to continuously or incrementally determine the velocity only of the body 12, 56 (in the case where unchirped fringes are used), or the velocity and the propagation direction of the body 12, 56 (in the case where chirped fringes are used), while the fringes rotate.

For each orientation of the fringes, the data analysis unit 22, 64 can determine the velocity of the body 12, 56 by performing, in the case of unchirped fringes the steps shown in FIG. 5, or in the case of chirped fringes the steps shown in FIG. 7A or 7B. Where chirped fringes have been used, the data analysis unit 22, 64 can also determine the propagation direction of the body 12, 56 by carrying out the steps shown in FIG. 9A, 9B or 9C. However, this need not be the case in every application.

The data analysis unit 22, 64 stores in memory 22b, 64b the determined velocity values (and the corresponding propagation direction, in the case of unchirped fringes) for the different angular orientations of the fringes. Then, the data analysis unit 22, 64 determines the actual velocity of the body 12, 56 as being the greatest determined velocity value.

In one embodiment, the velocimetry system 40, 70 may be adapted to determine the position of the body 56 within the measurement volume 48 while intersecting fringes having a non-constant fringe spacing along a length thereof. While the fringes 47 illustrated in FIGS. 3 and 4 have a constant fringe spacing along the length thereof i.e. they include parallel bright planes of light alternating with parallel dark planes, the fringes 146 illustrated in FIG. 15 have a fringe spacing that varies along the length of the fringes 146. The fringes 146 includes non-parallel bright planes 148 of light that alternate with non-parallel dark planes. For example, the fringe spacing taken at a first position P1 along the length of the fringes 146 is less than the fringe spacing taken at a second and different position P2 along the length of the fringes 146. Therefore, the time signal for a body 56 propagating through the fringes 146 varies as a function of the position along the length of the fringes 146 at which the body 56 intersects the fringes 146. For example, the time signal generated by a body 56 intersecting the fringes 146 at a first length position P1 may have a frequency greater than that of a time signal generated by the same body 56 intersecting the fringes 146 at a second and different length position P2. Therefore, the position along the length of the fringes 146 at which the body intersects the fringes 146 may be determined from the frequency of the time signal.

In this case, the controller 46 is adapted to generate a modulation pattern suitable for generating the fringes 146. The spatial light modulator 42 receives the modulation pattern from the controller 46 and adjusts the optical property value for each one of its points to generate the desired fringes 146. The processing unit 64a of the data analysis unit 64 is further adapted to determine the length position at which the body 56 intersects the fringes 146, and if the position of the fringes 146 within the measurement volume 48 is known, then the processing unit 64a may further determine the position of the body 56 within the measurement volume. For example, the memory 64b of the data analysis unit 64 may have stored thereon a database comprising length positions and corresponding reference frequencies. Upon reception of the time signal, the processing unit 64a determines the frequency of the received time signal and retrieves the corresponding length position value from the database stored on the memory 64b.

While in the foregoing description, the velocimetry systems 10, 40 and 70 are adapted to generate a single set of fringes, in other embodiments, velocimetry systems could be adapted to generate at least two sets of fringes within a measurement volume. The at least two sets of fringes may be concurrently generated within the measurement volume. Alternatively, they may be successively generated within the measurement volume. The at least two sets of fringes may be generated using a single spatial light modulator. Alternatively, at least two separate spatial light modulators may be used for generating the at least two sets of fringes.

Figure 16:
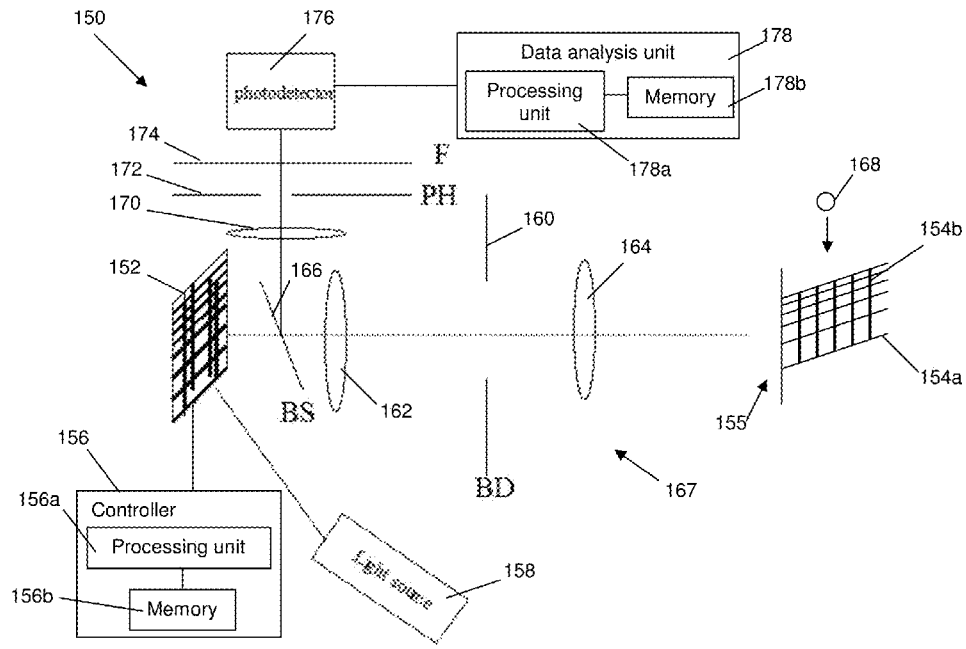
FIG. 16 is a schematic view of an exemplary deployment of a velocimetry system in accordance with another embodiment of the present invention, the velocimetry system including a single spatial light modulator for generating two sets of fringes.

FIG. 16 illustrates a velocimetry system 150 capable of generating two sets of different fringes having different angular orientations. In this embodiment, the velocimetry system 150 configured for measuring the velocity of a body 168 traveling through the measurement volume 155 based on back-scattered light energy measurements.

The velocimetry system 150 is generally similar to the velocimetry system 70 in that it also includes a reflective spatial light modulator 152, a controller 156, a light source 158, a beam splitter 166, a 4f optical system 167 including first and second lenses 162 and 164, and a beam dump 160), a third lens 170, a pinhole 172, a filter 174, a photodetector 176, and a data analysis unit 178. These elements are arranged in a manner generally similar to those counterpart elements shown in FIG. 4.

However, in this embodiment, the controller 156 is configured to generate two different reflectance patterns. For example, a first reflectance pattern may be suitable for generating a first set of unchirped fringes having a first angular orientation while a second reflectance pattern may be suitable for generating chirped fringes. Of course, different permutations of first and second reflectance patterns are possible. For instance, both first and second reflectance patterns could be suitable for generating chirped fringes of different types or the same type but having different chirp coefficients (e.g. linearly chirped fringes or quadratically chirped fringes). Alternatively, both first and second reflectance patterns could be suitable for generating unchirped fringes having different constant fringe spacing.

The spatial light modulator 152 is configured via the controller 156 to concurrently generate two sets of different fringes 154a and 154b having different angular orientations within the measurement volume 155.

In operation, the controller 156 determines two reflectance patterns adapted to generate the fringes 154a and 154b according to a user input for example, and transmits the reflectance patterns to the spatial light modulator 152. The spatial light modulator 152 generates the received reflectance patterns by adjusting the reflectance value of each point or unitary element thereof. The light source 158 emits a light beam which is incident on the spatial light modulator 152. The spatial light modulator 152 reflects and spatially modulates the incident light beam to propagate a spatially modulated light beam. At least some of the spatially modulated light beam passes through the beam splitter 166 and is focused by the lens 162 on the beam dump 160 which suppresses the diffraction orders of the spatially modulated light beam.

Thereafter, the spatially modulated light beam is focused by the lens 164 within the measurement volume 155 to generate the fringes 154 therein. Once the fringes 154a and 154b have been generated, the body 168 is urged to propagate therethrough and scatters light. Some of the back-scattered light is collected by the lens 164 and is focused on the beam dump 160. The back-scattered light propagating through the beam dump 160 passes through the lens 162 before reaching the beam splitter 166. At least some of the back-scattered light is then redirected by the beam splitter 166 in the direction to the third lens 170.

The back-scattered light collected by the third lens 170 is focused on the pinhole 172. The scattered light is then spatially and spectrally filtered by the pinhole 172 and the filter 174, respectively, before reaching the photodetector 176. The photodetector 176 measures the energy of the received scattered light, and transmits the measurement to the data analysis unit 178.

Since the two sets of fringes have different fringe spacing, it is possible to link a time signal to a corresponding set of fringes. The controller 156 is capable of transmitting to the data analysis unit 178 the characteristics of the two generated sets of fringes. For example, the controller could transmit the fringe spacing, the chirp coefficient n, and/or the like.

The data analysis unit 178 determines the modulation frequency of the time signal received from the photodetector 176, and the chirp coefficient of the received time signal. By comparing the chirp coefficient of the time signal to the chirp coefficient of the two set of fringes 154a and 154b, the data analysis unit 178 identifies the given set of fringes 154a and 154b through which the body 168 propagated to generate the received time signal.

Then, the data analysis unit 178 determines the velocity and/or propagation direction of the body 168 using the above described methods. For example, if the identified set of fringes is unchirped, then the data analysis unit 178 performs the steps shown in FIG. 5 to determine the velocity of the body 168. If the identified set of fringes is chirped, the data analysis unit 178 performs the steps shown in FIG. 7A or 7B to determine the velocity of the body 168, and may also apply the steps shown in FIG. 9A, 9B or 9C to determine the propagation direction of the body 168.

Figure 17:
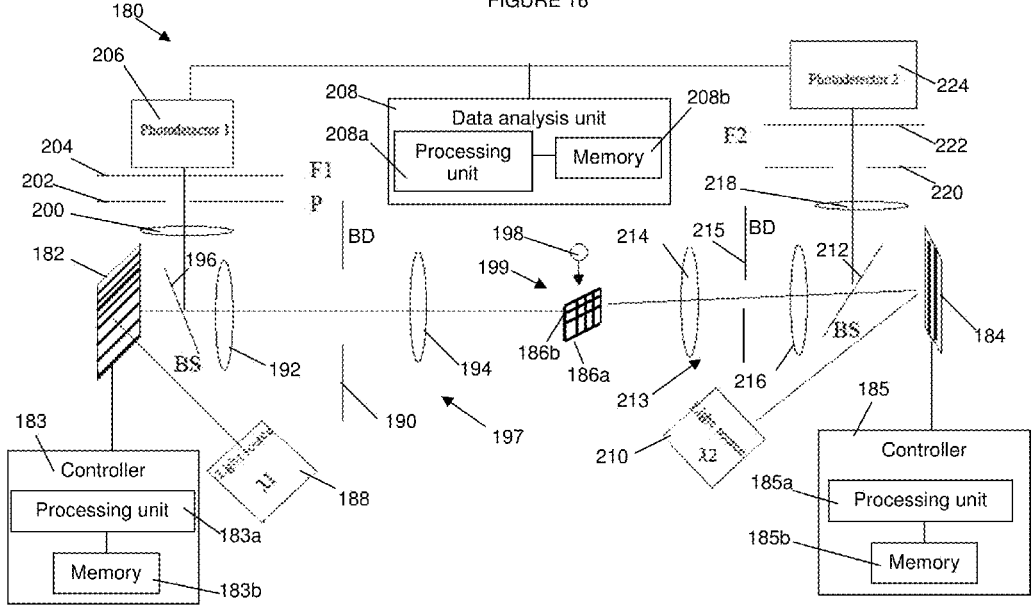
FIG. 17 is a schematic view of an exemplary deployment of a velocimetry system in accordance with another embodiment of the present invention, the velocimetry system including two single spatial light modulators and two photodetectors for measuring backward-scattered light and forward-scattered light.

While in the embodiment shown in FIG. 16, the velocimetry system 150 has a single spatial light modulator 152 for generating two sets of fringes 154a and 154b, it should be appreciated that, in other embodiments, an alternative velocimetry system could employ two spatial light modulators. FIG. 17 illustrates one such embodiment wherein a velocimetry system 180 is identified with reference numeral 180.

The velocimetry system 180 is generally similar to the velocimetry system 70 in that it also includes a first reflective spatial light modulator 182, a first controller 183, a first light source 188, a first beam splitter 196, a first 4f optical system 197 including first and second lenses 192 and 194, and a first beam dump 190, a third lens 200, a first pinhole 202, a first filter 204, a first photodetector 206, and a data analysis unit 208. These elements are arranged in a manner generally similar to those counterpart elements shown in FIG. 4.

The first light source 188 is arranged so as to emit a light beam having a first wavelength on the first spatial light modulator 182. The first spatial light modulator 182 is configured via the first controller 183 for generating a first reflectance pattern.

The first beam splitter 196 is positioned between the first spatial light modulator 182 and the first 4f optical system 197 (more specifically, the first lens 192). The first beam splitter 196 allows at least a portion of the modulated light beam coming from the first spatial light modulator 182 to propagate through the first 4f optical system 197 and serves to redirect at least some of the light back-scattered by the passage of the body 198 through the measurement volume 199, towards the third lens 200.

The beam dump 190 is arranged between the first and second lenses 192 and 194. The second lens 194 is arranged at a location rearward of the measurement volume 199.

In this embodiment, the third lens 200, the first pinhole 202, and the first filter 204 are located between the first beam splitter 196 and the first photodetector 206 in order to filter and focus the back-scattered light on the first photodetector 206.

However, in this embodiment, the velocimetry system 180 includes additional components, more specifically, a second reflective spatial light modulator 184, a second controller 184, a second light source 210, a second beam splitter 212, a second 4F optical system 213 including fourth and fifth lens 214 and 216 and a second beam dump 215, a sixth lens 218, a second pinhole 220, a second filter 222 and a second photodetector 224.

The second light source 188 is arranged so as to emit a light beam on the second spatial light modulator 184. In this embodiment, this light beam has a second wavelength different than the first wavelength of the light beam emitted by the first light source 188. In other embodiments, this may not be the case. It is possible that the light beams emitted by the first and second light sources have the same wavelength. However, in such cases, care should be taken to ensure that the fringes generated by the first spatial light modulator have a different fringe spacing than the fringes generated by the second spatial light modulator.

The second spatial light modulator 184 is configured via the second controller 185 for generating a second reflectance pattern.

It will be appreciated that in alternative embodiments, the second controller 185 may be omitted. In such cases, the second spatial light modulator could be configured to generate the second reflectance pattern by the first controller.

The second 4F optical system 213 and the second beam splitter 212 are disposed forwardly of the measurement volume 199, between the measurement volume 199 and the second spatial light modulator 184. The fourth lens 214 is positioned closest to the measurement volume 199. The second beam dump 215 is arranged between the fourth and fifth lenses 214 and 216. The second beam splitter 212 is placed between the fifth lens 216 and the second spatial light modulator 184.

The sixth lens 218, the second pinhole 220, and the second filter 222 are located between the second beam splitter 212 and the second photodetector 224 in order to filter and focus the back-scattered light on the second photodetector 224.

In operation, the first controller 183 determines a first reflectance pattern adapted to generate a first set of fringes 186a according to a user input for example, and transmits the first reflectance pattern to the first spatial light modulator 182. The first spatial light modulator 182 generates the received reflectance pattern by adjusting the reflectance value of each point or unitary element thereof. The first light source 188 emits a first light beam which is incident on the first spatial light modulator 182. The first spatial light modulator 182 reflects and spatially modulates the incident light beam to propagate a spatially modulated light beam. At least some of the spatially modulated light beam passes through the first beam splitter 196 and is focused by the first lens 192 on the beam dump 190 which suppresses the diffraction orders of the spatially modulated light beam.

Thereafter, the spatially modulated light beam is focused by the second lens 194 within the measurement volume 199 to generate the first set of fringes 186a therein. In this embodiment, the fringes of the first set are oriented horizontally. In other embodiments, these fringes could have a different orientation.

Similarly, the second controller 185 determines a second reflectance pattern adapted to generate a second set of fringes 186b according to a user input for example, and transmits the second reflectance pattern to the second spatial light modulator 184. The second spatial light modulator 184 generates the received reflectance pattern by adjusting the reflectance value of each point or unitary element thereof. The second light source 210 emits a second light beam which is incident on the second spatial light modulator 184. The second spatial light modulator 184 reflects and spatially modulates the incident light beam to propagate a spatially modulated light beam.

At least some of the spatially modulated light beam passes through the second beam splitter 212 and is focused by the fourth lens 214 on the second beam dump 215 which suppresses the diffraction orders of the spatially modulated light beam.

Thereafter, the spatially modulated light beam is focused by the fifth lens 216 within the measurement volume 199 to generate the second set of fringes 186b therein. In this embodiment, the fringes of the second set are of the same type as the fringes of the first set (i.e., the fringes from both sets are unchirped). Moreover, the fringes of the second set are oriented vertically and have the same fringe spacing as the fringes of the first set. While in the present embodiment, the first and second sets of fringes 186a and 186b are orthogonal to each other so as to allow measurement of the velocity components of the body 198 along two orthogonal directions, it will be appreciated that other configurations are possible. For example, the first and second sets of fringes 186a and 186b could have the same orientation. In still other embodiments, the fringes of the second set could have a different orientation and/or different fringe spacing. In addition, the fringes of the second set could be of a different type than the fringes of the first set. For example, the fringes of the first set could be unchirped while the fringes of the second set could be chirped.

Once the first and second set of fringes 186b have been generated, the body 198 is urged to propagate therethrough and scatters first and second beams of light. Some of the back-scattered light from the first beam is collected by the second lens 194 and is focused on the beam dump 190. The back-scattered light propagating through the beam dump 190 passes through the first lens 192 before reaching the first beam splitter 196. At least some of the back-scattered light is then redirected by the first beam splitter 196 in the direction to the third lens 200.

The back-scattered light collected by the third lens 200 is focused on the first pinhole 202. The scattered light is then spatially and spectrally filtered by the first pinhole 202 and the first filter 204, respectively, before reaching the first photodetector 206. The photodetector 206 detects light having the first wavelength, measures the energy of the received scattered light, and transmits the measurement to the data analysis unit 208.

Similarly, at least some of the back-scattered light from the second light beam collected by the fourth lens 214 and is focused on the second beam dump 215. The back-scattered light propagating through the second beam dump 215 passes through the fifth lens 216 before reaching the second beam splitter 212. At least some of the back-scattered light is then redirected by the second beam splitter 212 in the direction to the sixth lens 218.

Thereafter, the back-scattered light propagates through the sixth lens 218, the second pinhole 220, and the second filter 222 in order to filter and focus the back-scattered light on the second photodetector 224. The photodetector 224 detects light having the second wavelength, measures the energy of the received scattered light, and transmits the measurement to the data analysis unit 208.

The data analysis unit 208 is adapted to determine the velocity of the body 198 while passing through the measurement volume 199. The data analysis unit 208 receives the characteristics of the two sets of fringes, such as their respective fringe spacing, and the identity of the photodetector 206, 224 assigned to each set of fringes. When it receives a time signal from the first photodetector 206, the data analysis unit 208 determines the velocity of the body 198 using any suitable method described above based on the characteristics of the first set of fringes 186a generated by the first spatial light modulator 182. Similarly, when it receives a time signal from the second photodetector 224, the data analysis unit 208 determines the velocity of the body 198 using any suitable method described above based on the characteristics of the second set of fringes 186b generated by the second spatial light modulator 184. It should be understood that, in the case where the fringes from one or both the first and second sets are chirped fringes, the velocimetry system 180 may also determine the propagation direction of the body 198, as described above.

In this embodiment, the velocimetry system 180 is provided with two photodetectors 206 and 224, each one capable of detecting light having a different wavelength. In other embodiments, it may be possible to provide a single photodetector for the velocimetry system capable of detecting light having different predetermined wavelengths. In such cases where only a single photodetector is used, the second photodetector 224, the second beam splitter 212, the sixth lens 218, the second pinhole 220, and the second filter 222 may be omitted. In operation, such single photodetector would transmit to the data analysis unit the time signals corresponding to the measured energy of the back-scattered light generated by the body 198 while passing through the first set of fringes and the measured energy of the forward-scattered light generated by the body 198 while passing through the second set of fringes.

In the embodiment shown in FIG. 17, the velocimetry system 180 provided with two spatial light modulators 182 and 184, was configured for measuring the velocity of a body 186 traveling through the measurement volume 199 based on back-scattered light energy measurements. In other embodiments, a similar velocimetry system could be configured which allows the velocity of a body traveling through a measurement volume to be determined based on forward-scattered light energy measurements. Such an embodiment is shown in FIG. 18 wherein a velocimetry system is indicated generally with reference numeral 230.

The velocimetry system 230 is generally similar to the velocimetry system 180 shown in FIG. 17 in that it too includes a first reflective spatial light modulator 236, a first controller 240, a first light source 244, a first 4f optical system 245 including first and second lenses 248 and 250, and a beam dump 246, a third lens 266, a first pinhole 268, a first filter 270, a first photodetector 262, and a data analysis unit 268. These elements are arranged in a manner generally similar to those counterpart elements shown in FIG. 3.

The first light source 244 is arranged so as to emit a light beam having a first wavelength on the first spatial light modulator 236. The first spatial light modulator 236 is configured via the first controller 240 for generating a first reflectance pattern.

The first 4F optical system 245 is positioned between the first spatial light modulator 236 and measurement volume 233. The first beam dump 246 is arranged between the first and second lenses 248 and 250. The second lens 250 is arranged at a location rearward of the measurement volume 233.

In this embodiment, the third lens 266, the second pinhole 268, and the first filter 270 are located forwardly of the measurement volume 233, between the measurement volume 233 and the first photodetector 262 in order to filter and focus the forward-scattered light on the first photodetector 262.

The velocimetry system 230 also includes additional components, more specifically, a second reflective spatial light modulator 238, a second controller 254, a second light source 253, a second 4f optical system 255 including fourth and fifth lenses 258 and 260, and a second beam dump 256, a sixth lens 272, a second pinhole 274, a second filter 276, a second photodetector 264. These elements are arranged in a manner generally similar to those counterpart elements 236, 240, 244, 245, 266, 268, 270 and 262.

The second light source 253 is arranged so as to emit a light beam having a second wavelength on the second spatial light modulator 238. The second spatial light modulator 238 is configured via the second controller 254 for generating a second reflectance pattern.

It will be appreciated that in alternative embodiments, the second controller 254 may be omitted. In such cases, the second spatial light modulator could be configured to generate the second reflectance pattern by the first controller.

The second 4F optical system 255 is positioned between the second spatial light modulator 238 and measurement volume 233. The second beam dump 256 is arranged between the fourth and fifth lenses 258 and 260. The sixth lens 260 is arranged at a location rearward of the measurement volume 233.

The sixth lens 272, the second pinhole 274, and the first filter 276 are located forwardly of the measurement volume 233, between the measurement volume 233 and the second photodetector 264 in order to filter and focus the forward-scattered light on the second photodetector 264.

In operation, the first controller 240 determines a first reflectance pattern adapted to generate a first set of fringes 234a according to a user input for example, and transmits the first reflectance pattern to the first spatial light modulator 236. The first spatial light modulator 236 generates the received reflectance pattern by adjusting the reflectance value of each point or unitary element thereof. The first light source 244 emits a first light beam which is incident on the first spatial light modulator 236. The first spatial light modulator 236 reflects and spatially modulates the incident light beam to propagate a spatially modulated light beam. The spatially modulated light beam is focused by the first lens 248 on the first beam dump 246 which suppresses the diffraction orders of the spatially modulated light beam.

Thereafter, the spatially modulated light beam is focused by the second lens 250 within the measurement volume 233 to generate the first set of fringes 234a therein. In this embodiment, the fringes of the first set are oriented horizontally. In other embodiments, these fringes could have a different orientation.

Similarly, the second controller 254 determines a second reflectance pattern adapted to generate a second set of fringes 234b. according to a user input for example, and transmits the second reflectance pattern to the second spatial light modulator 238. The second spatial light modulator 238 generates the received reflectance pattern by adjusting the reflectance value of each point or unitary element thereof. The second light source 253 emits a second light beam which is incident on the second spatial light modulator 238. The second spatial light modulator 238 reflects and spatially modulates the incident light beam to propagate a spatially modulated light beam.

The spatially modulated light beam is focused by the fourth lens 258 on the second beam dump 256 which suppresses the diffraction orders of the spatially modulated light beam.

Thereafter, the spatially modulated light beam is focused by the fifth lens 260 within the measurement volume 233 to generate the second set of fringes 234b therein. In this embodiment, the fringes of the second set are of the same type as the fringes of the first set (i.e., the fringes from both sets are unchirped). Moreover, the fringes of the second set are oriented vertically and have the same fringe spacing as the fringes of the first set. In an alternative embodiment, the first and second sets of fringes could have the same orientation. In still other embodiments, the fringes of the second set could have a different orientation and/or different fringe spacing. In addition, the fringes of the second set could be of a different type than the fringes of the first set. For example, the fringes of the first set could be unchirped while the fringes of the second set could be chirped.

Once the first and second set of fringes 234b have been generated, the body 234 is urged to propagate therethrough and scatters first and second beams of light. Some of the forward-scattered light from the first beam is collected by the third lens 266 and is focused on the first pinhole 268. The scattered light is then spatially and spectrally filtered by the first pinhole 268 and the first filter 270, respectively, before reaching the first photodetector 262. The photodetector 262 detects light having the first wavelength, measures the energy of the received scattered light, and transmits the measurement to the data analysis unit 268.

Similarly, at least some of the forward-scattered light from the second light beam is collected by the sixth lens 272 and focused on the second pinhole 274. The scattered light is then spatially and spectrally filtered by the second pinhole 274 and the second filter 276, respectively, before reaching the second photodetector 264. The photodetector 264 detects light having the second wavelength, measures the energy of the received scattered light, and transmits the measurement to the data analysis unit 268.

The data analysis unit 268 is adapted to determine the velocity of the body 234 while passing through the measurement volume 233. The data analysis unit 268 receives from the first and second controllers 240 and 254 the characteristics of the two sets of fringes, such as their respective fringe spacing, and the identity of the photodetector 262, 264 assigned to each set of fringes. When it receives a time signal from the first photodetector 262, the data analysis unit 268 determines the velocity of the body 234 using any suitable method described above based on the characteristics of the first set of fringes 234a generated by the first spatial light modulator 236. Similarly, when it receives a time signal from the second photodetector 264, the data analysis unit 268 determines the velocity of the body 234 using any suitable method described above based on the characteristics of the second set of fringes 234b generated by the second spatial light modulator 238. It should be understood that, in the case where the fringes from one or both the first and second sets are chirped fringes, the velocimetry system 230 may also determine the propagation direction of the body 234, as described above.

In this embodiment, the velocimetry system 230 is provided with two spatial light modulators 236 and 238 for generating two sets of fringes in the measurement volume 233. In other embodiments, it may be possible to provide the velocimetry system with a single spatial light modulator for generating a one or more set(s) of fringes, a single controller and single light source. In such cases, the first and second detectors 262 and 264 could be each provided with a suitable mask and positioned at different locations with respect to the measurement volume 233 in order to measure two time signals each corresponding to the energy of the scattered light produced by the body 234 as it passes through the one or more sets of fringes. For example, the photodetector 262 may be positioned to measure forward scattered light while the photodetector 264 may be positioned to measure backward scattered light. The data analysis unit 268 could then determine the velocity and the size of the body 234 using the time signals received from the photodetectors 262 and 264. The size of the body 234 may be estimated from the phase difference (time delay) between the scattered light components detected by the two detectors 262 and 264. Since a given set of fringes having a given fringe spacing is suitable for measuring a given size range for the body 234, it is possible to measure a large range of body size without additional optical components by changing the fringe spacing of the generated fringes.

In one embodiment, the velocimetry system 230 may be used for generating three sets of fringes. For example, a first spatial light modulator such as the spatial light modulator 236 may be adapted to generate two sets of fringes in the measurement volume 233 while a second spatial light modulator such as the spatial light modulator 238 may be adapted to generate a third set of fringes in the measurement volume 233. In one embodiment, the two sets of fringes generated by the first spatial light modulator 236 may be orthogonal together, and the second spatial light modulators may be arranged with respect to the spatial light modulator 236 so that the third set of fringes be orthogonal to the first and second sets of fringes in order to measure the velocity components for the body 234 according to three orthogonal directions. In another embodiment, the second spatial light modulator 238 may not be arranged with respect to the first spatial light modulator 236 so that the third set of fringes is not orthogonal to the first and second sets of fringes. In this case, the velocity components according to three orthogonal directions may be determined by numerically applying coordinate transformation in order to numerically rotate the third fringe pattern before extracting the three orthogonal velocity components. It should also be understood that three different spatial light modulators may be used for generating three different sets of fringes.

It will be appreciated that the velocimetry systems 150, 180, and 230 may be adapted to generate at least two sets of fringes having different angular orientations. For example, FIG. 19A schematically illustrates two sets of fringes orthogonal to each other that may be generated by the velocimetry systems 150, 180, and 230. In this case, the two sets of fringes intersect at a 90 degree angle. FIG. 19B illustrates another exemplary configuration in which two sets of fringes intersect at an angle of 50 degrees.

The velocimetry systems 150, 180, and 230 may also be adapted to generate rotating sets of fringes and determine the propagation direction of the body 168, 198, and 234, respectively, when at least one of the generated sets of fringes is chirped.

While in the velocimetry systems 150, 180, and 230, the spatial light modulators 152, 182 and 184, and 234 and 236, respectively, operate in reflection mode, it will be appreciated that any one of these velocimetry systems may be employed one or more spatial light modulators operating in transmittance mode.

While the velocimetry systems 40 and 70, 150, 180, and 230 include the 4f optical systems 50, 167, 197 and 213, and 245 and 255 for reducing back reflections and scattering, it will be appreciated that other configurations may be possible. For example, at least one of the 4f optical systems 50, 167, 197 and 213, and 245 and 255 may be replaced by a 2f optical system, i.e. a single lens may be used in replacement of a 4f optical system.

As configured, the above-described velocimetry systems may allow at least some limitations of a photodetector used for measuring the scattered light, to be overcome. By way of background, these limitations are explained below.

Figure 20A:
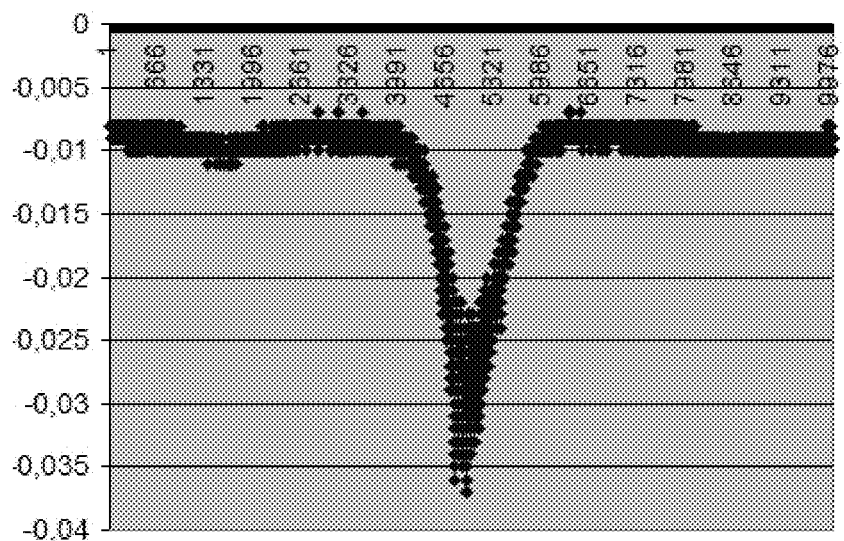
FIG. 20A illustrates an exemplary time signal generated by a set of fringes generated by a spatial light modulator of a velocimetry system, the photodetector being incapable of detecting variations in the scattered light energy of a body propagating though a measurement volume.

For example, a photodetector having a bandwidth of 100 kHz can only detect light pulses having a pulse width of at least 10 μs. If such a photodetector is used to detect the light scattered by a body passing through a set of unchirped fringes having of a fringe spacing of 10 μm, then the maximal velocity that can be detected by the photodetector for bodies propagating though the fringes is 1 m/s, since $v=d*f=d*(1/\Delta t)$, where v, d, f, and $\Delta t$ represent the velocity of bodies, the fringe spacing, the frequency of the scattered light, and the pulse width, respectively. Therefore, if a body had a velocity greater than 1 m/s, the velocimetry system would not be able to measure it because of limitations in the photodetector. For example, if a body having a velocity of 10 m/s propagates through the 10 μm spacing fringes, then the pulse width of the scattered light is 1 μs, as illustrated in FIG. 20A. In such case, the photodetector would not be able to detect the 1 μs width pulses, because its sensitivity threshold is at least 10 μs.

In prior art systems, the limitations of such a photodetector would be remedied by replacing the photodetector for one with increased sensitivity.

Figure 20B:
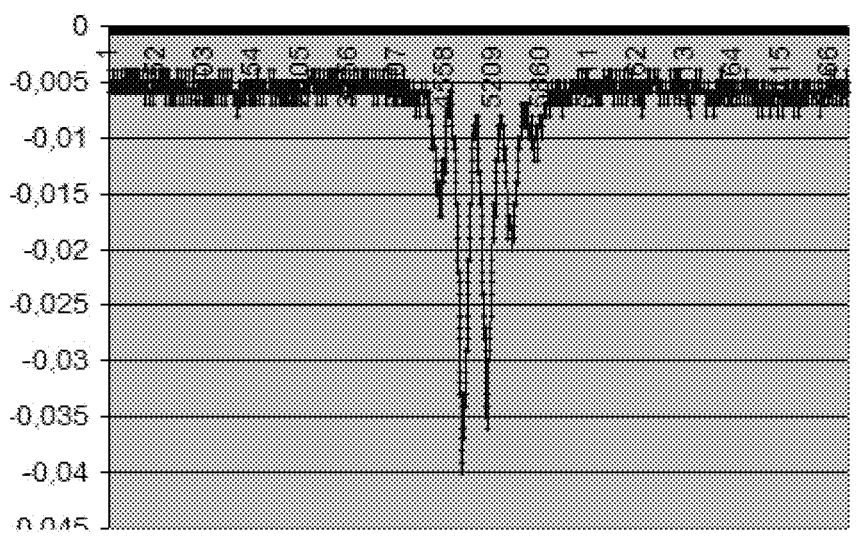
FIG. 20B illustrates an exemplary time signal generated by a set of fringes generated by a spatial light modulator of a velocimetry system, the photodetector being capable of detecting variations the scattered light energy of a body propagating though a measurement volume.

However, in velocimetry systems constructed in accordance with the principles of the present invention, it is possible to remedy this limitation, without having to change the photodetector. The light modulation pattern generated by the controller of the velocimetry system can be changed to generate a set of fringes having a greater fringe width so as to remain within the bandwidth limit of the photodetector. Referring back to the above example, if the fringe spacing is increased to 100 μm, then the width of the pulses detected by the photodetector increases to 10 μs which is within the detection bandwidth of the photodetector. The velocity of the particles can then be determined from the time signal illustrated in FIG. 20B.

In operation, the data analysis unit could transmit to the controller a signal indicative of that the photodetector cannot detect the scattered light energy. In response to the signal, the controller could vary the characteristics of the generated fringes (i.e. vary the fringe width) to overcome the bandwidth limitation of the photodetector.

The above example is merely illustrative. For example, the numerical values have been provided without taking into account of elements such as Nyquist sampling criteria, which requires higher sampling rate. Similarly, limitations related to the digitization of the measurement data may also be overcome by modifying the generated fringes using a method similar to the above-described method that allows for overcoming the limitations of a photodetector.

Although the foregoing description and accompanying drawings relate to specific embodiments of the present invention as presently contemplated by the inventor(s), it will be understood that various changes, modifications and adaptations, may be made without departing from the spirit of the invention. The scope of the invention is therefore intended to be limited solely by the scope of the claims.

What is claimed is:

1. A velocimetry system for measuring the velocity of a moving body propagating through a measurement volume, comprising:
   a light source for emitting a light beam;
   a controller for, generating a modulation pattern corresponding to a desired set of fringes to be generated in the measurement volume;
   a spatial light modulator operatively connected to the controller unit to receive therefrom the modulation pattern, the spatial light modulator being configured to generate the desired set of fringes in the measurement volume by spatially modulating the light beam according to the modulation pattern;
   a light detector for measuring the energy of the light scattered by the moving body as it intersects the fringes; and
   a data analysis unit operatively connected to the light detector and adapted to determine the velocity of the moving body from at least one characteristic of the fringes and the energy of the scattered light measured by the light detector,
   wherein the controller is configured to control the spatial light modulator and to transmit the modulation pattern to the spatial light modulator, the modulation pattern providing a value of an optical property for each point of the spatial light modulator.

2. The velocimetry system of claim 1, wherein the light source is selected from the group consisting of: (a) a coherent light source; and (b) a non-coherent light source.

3. The velocimetry system of claim 1, wherein the light source is adapted to emit visible light.

4. The velocimetry system of claim 1, wherein the modulation pattern is a transmittance pattern having a transmittance value for each point of the spatial light modulator.

5. The velocimetry system of claim 4, wherein the spatial light modulator is adapted to operate in transmittance, the spatial light modulator having opaque regions arranged along a given direction and each opaque region being positioned between two transmissive regions, the opaque regions each substantially preventing light from propagating therethrough and the transmissive regions each allowing light to propagate therethrough.

6. The velocimetry system of claim 1, wherein the modulation pattern is a reflectance pattern having a reflectance value for each point of the spatial light modulator.

7. The velocimetry system of claim 6, wherein the spatial light modulator is adapted to operate in reflectance, the spatial light modulator having reflective regions arranged along a given direction and each reflective region being positioned between two non-reflective regions, the reflective regions each substantially reflecting light incident thereon and the non-reflective regions each preventing reflection of light thereon.

8. The velocimetry system of claim 1, wherein the controller is adapted to determine the characteristics of the modulation pattern according to a user input.

9. The velocimetry system of claim 8, wherein the user input includes the dimensions of the modulation pattern and the value of an optical property for each point of the modulation pattern.

10. The velocimetry system of claim 8, wherein the user input includes desired specifications for the fringes.

11. The velocimetry system of claim 8, wherein the user input includes one of an estimated velocity for the moving body and an estimated range of velocity for the moving body.

12. The velocimetry system of claim 1, wherein the spatial light modulator is selected from the group consisting of: (a) a dynamic micromirror display; (b) a pico-projector; (c) a transmitting liquid crystal modulator; (d) a liquid crystal on silicon display; (e) a parallel aligned spatial light modulator; (f) a deformable mirror device; (g) a membrane spatial modulator; (h) a microelectromechanical system; and (i) a micro-opto-electro-mechanical system.

13. The velocimetry system of claim 1, wherein the light detector is arranged for measuring the energy of the light scattered in one of a forward direction, a backward direction, and a direction other than the forward direction and the backward direction.

14. The velocimetry system of claim 1, wherein the light detector is selected from the group consisting of: (a) a photomultiplier; (b) an avalanche photodiode detector; (c) a PIN diode; and (d) an ultrafast photodetector.

15. The velocimetry system of claim 1, wherein the fringes generated in the measurement volume include unchirped fringes having a given fringe spacing, and the energy of the scattered light measured by the light detector corresponds to a time signal representing the measured energy as a function of time.

16. The velocimetry system of claim 15, wherein the data analysis unit is adapted to: convert the energy of the scattered light measured by the light detector into a frequency domain to obtain a frequency signal; determine a peak frequency of the frequency signal; and calculate the velocity of the moving body using the determined peak frequency and the fringe spacing of the unchirped fringes.

17. The velocimetry system of claim 1, wherein the fringes generated in the measurement volume have a spatial variation.

18. The velocimetry system of claim 17, wherein the fringes generated in the measurement volume include chirped fringes having a given average fringe spacing, and the energy of the scattered light measured by the light detector corresponds to a time signal representing the measured energy as a function of time.

19. The velocimetry system of claim 18, wherein the data analysis unit is adapted to:
segment the time signal into at least two time segments each having a respective local fringe spacing;
convert a given one of the two time segments into a frequency domain to obtain a frequency segment;
determine the local peak frequency of the frequency segment; and
calculate the velocity of the moving body using the determined local peak frequency and the local fringe spacing corresponding to the given one of the two time segments.

20. The velocimetry system of claim 18, wherein the data analysis unit is adapted to: determine a power spectrum for the time signal; determine an average frequency for the power spectrum; and calculate the velocity of the moving body using the average frequency and the given average fringe spacing of the chirped fringes.

21. The velocimetry system of claim 18, wherein the data analysis unit is further adapted to determine a propagation direction for the moving body.

22. The velocimetry system of claim 21, wherein the data analysis is adapted to:
segment the time signal into at least two time segments;
determine a number of peaks within a given one of the at least two time segments;
compare the determined number of peaks to a reference value; and
determine the propagation direction for the moving body as a function of the comparison.

23. The velocimetry system of claim 21, wherein the data analysis system is adapted to:
segment the time signal into at least two time segments;
generate a mirror image of a given one of the at least two time segments and add the mirror image to the given one of the at least two time segments;
generate a curve fitting the given one of the at least two time segments and the mirror image;
determine a maximum of the curve;
compare the determined maximum to a reference value; and
determine the propagation direction for the moving body as a function of the comparison.

24. The velocimetry system of claim 21, wherein the data analysis system is adapted to:
generate a spectrogram of the time signal;
determine a frequency variation in time using the spectrogram; and determine the propagation direction for the moving body as a function of the frequency variation.

25. The velocimetry system of claim 1, wherein the fringes generated in the measurement volume include non-parallel bright planes of light alternating with non-parallel dark planes so that a fringe spacing varies along a length of the fringes.

26. The velocimetry system of claim 25, wherein the data analysis unit is further adapted to determine a position along the length of the fringes at which the moving body intersects the fringes by comparing a frequency of the measured energy to reference frequency values.

27. The velocimetry system of claim 1, further including a 4f optical system positioned between the spatial light modulator and the measurement volume.

28. The velocimetry system of claim 1, further including a 2f optical system positioned between the spatial light modulator and the measurement volume.

29. The velocimetry system of claim 1, wherein the controller is adapted to rotate the modulation pattern according to different angular orientations to effect rotation of the fringes generated in the measurement volume.

30. The velocimetry system of claim 29, wherein the data analysis is adapted to determine the velocity of the moving body for each one of the different angular orientations and select the greatest determined velocity as being an actual velocity for the moving body.

31. The velocimetry system of claim 1, wherein the modulation pattern is adapted to generate a first set of fringes and a second set of fringes within the measurement volume, the first and second sets of fringes having different orientations.

32. The velocimetry system of claim 1, further including an additional photodetector positioned at a position different than that of the light detector.

33. The velocimetry system of claim 32, wherein the data analysis unit is further adapted to determine a size of the moving body using the phase difference between scattered light components detected by the light detector and the photodetector.

34. The velocimetry system claim 1, wherein the set of fringes is an image of the modulation pattern.

35. The velocimetry system of claim 34, further including an optical imaging system positioned between the spatial light modulator and the measurement volume for one of magnifying and demagnifying the fringes projected by the spatial light modulator, the fringes generated in the measurement volume being one of a magnified and a demagnified image of the modulation pattern, respectively.

36. The velocimetry system of claim 1, wherein the fringes generated in the measurement volume include interference fringes resulting from a Fresnel diffraction of the light beam incident on the spatial light modulator.

37. The velocimetry system of claim 1, wherein the moving body is selected from the group consisting of: (a) a particle; (b) a droplet; (c) a microscopic object; (d) a biological cell; and (e) the constituent part of the biological cell.

38. A method for determining the velocity of a moving body propagating through a measurement volume, comprising:
generating a modulation pattern for a spatial light modulator according to a desired set of fringes to be generated in the measurement volume, the modulation pattern providing a value of an optical property for each point of the spatial light modulator;
adjusting the optical properties of the spatial light modulator according to the modulation pattern;
propagating a light beam on the spatial light modulator, thereby spatially modulating the light beam according to the modulation pattern and generating the desired set of fringes in the measurement volume;
measuring the energy of the light scattered by the moving body while propagating in the measurement volume and intersecting the fringes; and
determining the velocity of the moving body using at least one characteristic of the fringes and the energy of the scattered light measured.

39. The method of claim 38, wherein said generating a modulation pattern includes generating a transmittance pattern having a transmittance value for each point of the spatial light modulator.

40. The method of claim 39, wherein said adjusting the optical properties of the spatial light modulator causes a generation of opaque regions and transmissive regions on the spatial light modulator, the opaque regions being arranged along a given direction and each opaque region being positioned between two transmissive regions, the opaque regions each substantially preventing light from propagating therethrough and the transmissive regions each allowing light to propagate therethrough.

41. The method of claim 38, wherein said generating a modulation pattern includes generating a reflectance pattern having a reflectance value for each point of the spatial light modulator.

42. The method of claim 41, wherein said adjusting the optical properties of the spatial light modulator causes a generation of reflective regions and non-reflective regions on the spatial light modulator, the reflective regions being arranged along a given direction and each reflective region positioned between two non-reflective regions, the reflective regions each substantially reflecting light incident thereon and the non-reflective regions each preventing reflection of light thereon.

43. The method of claim 38, wherein said propagating a light beam includes propagating one of a coherent light beam and a non-coherent light beam on the spatial light modulator.

44. The method of claim 38, wherein said propagating a light beam includes propagating a beam of visible light on the spatial light modulator.

45. The method of claim 38, wherein said measuring the energy of the light scattered includes measuring the energy of light scattered in one of a forward direction, a backward direction, and a direction other than the forward direction and the backward direction.

46. The method of claim 38, wherein said generating a modulation pattern includes generating an unchirped pattern adapted to generate unchirped fringes having a given fringe spacing within the measurement volume, the energy of the scattered light measured by the light detector corresponding to a time signal representing the measured energy as a function of time.

47. The method of claim 46, wherein said determining the velocity of the moving body includes:
converting the energy of the scattered light measured by the light detector into a frequency domain to obtain a frequency signal;
determining a peak frequency of the frequency signal; and
calculating the velocity of the moving body using the determined peak frequency and the fringe spacing of the unchirped fringes.

48. The method of claim 38, wherein said generating a modulation pattern includes generating a spatially varying modulation pattern adapted to generate fringes having a spatial variation.

49. The method of claim 48, wherein said generating the spatially varying modulation pattern includes generating a chirped pattern adapted to generate chirped fringes having a given average fringe spacing in the measurement volume, the energy of the scattered light measured by the light detector corresponding to a time signal representing the measured energy as a function of time.

50. The method of claim 49, wherein said determining the velocity of the moving body includes:
segmenting the time signal into at least two time segments each having a respective local fringe spacing;
converting a given one of the two time segments into a frequency domain to obtain a frequency segment;
determining the local peak frequency of the frequency segment; and
calculating the velocity of the moving body using the determined local peak frequency and the local fringe spacing corresponding to the given one of the two time segments.

51. The method of claim 49, wherein said determining the velocity of the moving body includes:
determining a power spectrum for the time signal;
determining an average frequency for the power spectrum; and calculating the velocity of the moving body using the average frequency and the given average fringe spacing of the chirped fringes.

52. The method of claim 49, further including determining a propagation direction for the moving body.

53. The method of claim 52, wherein said determining the propagation direction for the moving body includes:
segmenting the time signal into at least two time segments;
determining a number of peaks within a given one of the at least two time segments;
comparing the determined number of peaks to a reference value; and determining the propagation direction for the moving body as a function of the comparison.

54. The method of claim 52, wherein said determining the propagation direction for the moving body includes:
segmenting the time signal into at least two time segments;
generating a mirror image of a given one of the at least two time segments and add the mirror image to the given one of the at least two time segments;
generating a curve fitting the given one of the at least two time segments and the mirror image;
determining a maximum of the curve; comparing the determined maximum to a reference value; and
determining the propagation direction for the moving body as a function of the comparison.

55. The method of claim 52, wherein said determining the propagation direction for the moving body includes:
generating a spectrogram of the time signal;
determining a frequency variation in time using the spectrogram; and
determining the propagation direction for the moving body as a function of the frequency variation.

56. The method of claim 38, wherein said generating a modulation pattern includes generating a modulation pattern adapted to create non-parallel fringes having non-parallel bright planes of light alternating with non-parallel dark planes, a fringe spacing of the non-parallel fringes varying along a length of the fringes.

57. The method of claim 56, further including determining a position along the width of the fringes at which the moving body intersects the fringes by comparing a frequency of the measured energy to reference frequency values.

58. The method of claim 38, further including propagating a modulated light beam projected by the spatial light modulator through a 4f optical system positioned between the spatial light modulator and the measurement volume for reducing back reflections and scattering.

59. The method of claim 38, further including propagating a modulated light beam projected by the spatial light modulator through a 2f optical system positioned between the spatial light modulator and the measurement volume.

60. The method of claim 38, further including rotating the modulation pattern according to different angular orientations to effect rotation of the fringes generated in the measurement volume.

61. The method of claim 60, wherein said determining the velocity of the moving body includes determining the velocity of the moving body for each one of the different angular orientations and selecting the greatest determined velocity as being an actual velocity for the moving body.

62. The method of claim 38, wherein said generating a modulation pattern includes generating a modulation pattern adapted to generate a first set of fringes and a second set of fringes within the measurement volume, the first and second sets of fringes having different orientations.

63. The method of claim 38, wherein said measuring the energy of the light scattered includes measuring a first scattered light component from a first position and a second scattered light component from a second position different from the first position.

64. The method of claim 63, further including determining a size of the moving body using the phase difference between first and second scattered light components.

65. The method of claim 38, wherein the set of fringes is an image of the modulation pattern.

66. The method of claim 65, further including one of magnifying and demagnifying a modulated light beam projected by the spatial light modulator, the fringes generated in the measurement volume being one of a magnified and a demagnified image of the modulation pattern, respectively.

67. The method of claim 38, wherein the fringes generated in the measurement volume include interference fringes resulting from a Fresnel diffraction of the light beam incident on the spatial light modulator.

68. The method of claim 38, further including urging the body to propagate in the measurement volume so as to cause the body to intersect the fringes and scatter light.

69. The method of claim 38, further including determining characteristics of the modulation pattern according to a user input.

70. The method of claim 69, wherein the user input includes the dimensions of the modulation pattern and a value of an optical property for each point of the modulation pattern.

71. The method of claim 69, wherein the user input includes desired specifications for the fringes.

72. The method of claim 69, wherein the user input includes one of an estimated velocity for the moving body and an estimated range of velocity for the moving body.

* * * * *